(12) United States Patent
Nakanishi et al.

(10) Patent No.: US 7,961,777 B2
(45) Date of Patent: Jun. 14, 2011

(54) SIGNAL PROCESSING APPARATUS, SIGNAL PROCESSING METHOD, AND PROGRAM

(75) Inventors: Takashi Nakanishi, Tokyo (JP);
Shunsuke Mochizuki, Tokyo (JP);
Masahiro Yoshioka, Tokyo (JP);
Ryosuke Araki, Tokyo (JP); Hiroto Kimura, Tokyo (JP); Seiji Wada, Kanagawa (JP); Hiroshi Ichiki, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 742 days.

(21) Appl. No.: 11/947,423

(22) Filed: Nov. 29, 2007

(65) Prior Publication Data
US 2008/0279267 A1 Nov. 13, 2008

(30) Foreign Application Priority Data

Dec. 26, 2006 (JP) ................................. 2006-350355

(51) Int. Cl.
*H03K 9/00* (2006.01)
*H04B 3/46* (2006.01)
(52) U.S. Cl. ........................ 375/224; 375/316
(58) Field of Classification Search .................. 375/224, 375/227–228, 279, 284–285, 316, 322, 329, 375/346; 455/67.4, 67.11, 67.13–14, 115, 455/115.1, 115.2, 226.1, 423; 324/76.11–76.13, 324/76.15, 76.19, 76.24; 702/108–111, 117, 702/122, 124, 126, 191
See application file for complete search history.

(56) References Cited

U.S. PATENT DOCUMENTS

| | | | | |
|---|---|---|---|---|
| 3,727,134 A * | 4/1973 | Melvin | ........................ | 375/283 |
| 3,864,632 A * | 2/1975 | Chang | ........................ | 375/230 |
| 5,144,642 A * | 9/1992 | Weinberg et al. | ............. | 375/228 |
| 6,185,261 B1 * | 2/2001 | Creigh et al. | ............. | 375/285 |
| 6,389,068 B1 * | 5/2002 | Smith et al. | ................... | 375/225 |
| 6,510,190 B1 * | 1/2003 | Wu et al. | ........................ | 375/355 |
| 6,713,914 B2 * | 3/2004 | Yoshida et al. | ................. | 310/89 |
| 7,680,655 B2 * | 3/2010 | Canniff et al. | ................ | 704/233 |
| 2007/0121767 A1 * | 5/2007 | Yamazaki | ..................... | 375/346 |

(Continued)

FOREIGN PATENT DOCUMENTS
JP 2004-220264 8/2004

OTHER PUBLICATIONS

U.S. Appl. No. 11/947,049, filed Nov. 29, 2007, Mochizuki, et al.

(Continued)

*Primary Examiner* — Tesfaldet Bocure
*Assistant Examiner* — Lawrence B Williams
(74) *Attorney, Agent, or Firm* — Oblon, Spivak, McClelland, Maier & Neustadt, L.L.P.

(57) ABSTRACT

A signal processing apparatus configured to process a signal transmitted via a transmission path where a waveform represented by a signal value of a particular symbol is stationarily distorted in accordance with values of symbols transmitted prior to the particular symbol, including the following elements: a receiving unit configured to receive a test signal which is the signal including symbols set to predetermined values via the transmission path; an obtaining unit configured to obtain the signal value of the particular symbol from the test signal received by the receiving unit; and a characteristic computing unit configured to compute a characteristic of distortion of the waveform represented by the signal value of the particular symbol in accordance with the values of the symbols transmitted prior to the particular symbol on the basis of waveforms represented by signal values obtained by the obtaining unit from a plurality of test signals.

10 Claims, 18 Drawing Sheets

U.S. PATENT DOCUMENTS

2007/0171964 A1* 7/2007 Chen et al. .................. 375/227
2008/0151121 A1* 6/2008 Mochizuki et al. ........... 348/607
2008/0151979 A1* 6/2008 Araki et al. .................. 375/224
2008/0212723 A1* 9/2008 Mochizuki et al. ........... 375/346
2009/0279640 A1* 11/2009 Nakanishi et al. ........... 375/296

OTHER PUBLICATIONS

U.S. Appl. No. 11/947,198, filed Nov. 29, 2007, Araki, et al.
U.S. Appl. No. 11/953,397, filed Dec. 10, 2007, Mochizuki, et al.

* cited by examiner

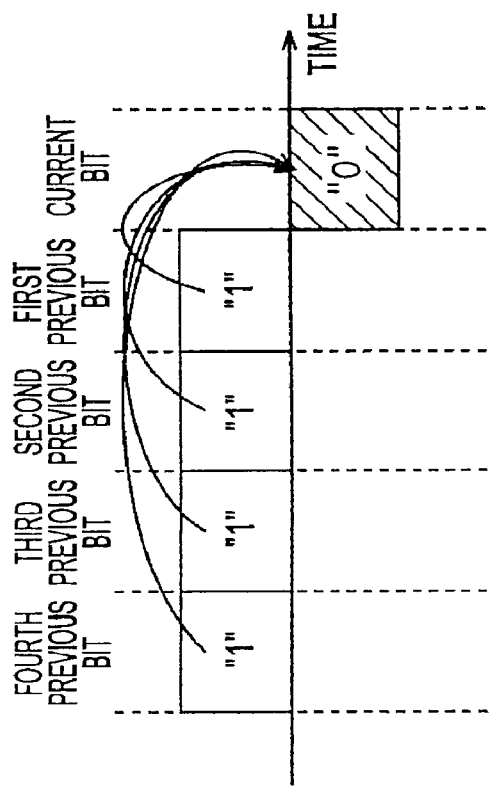

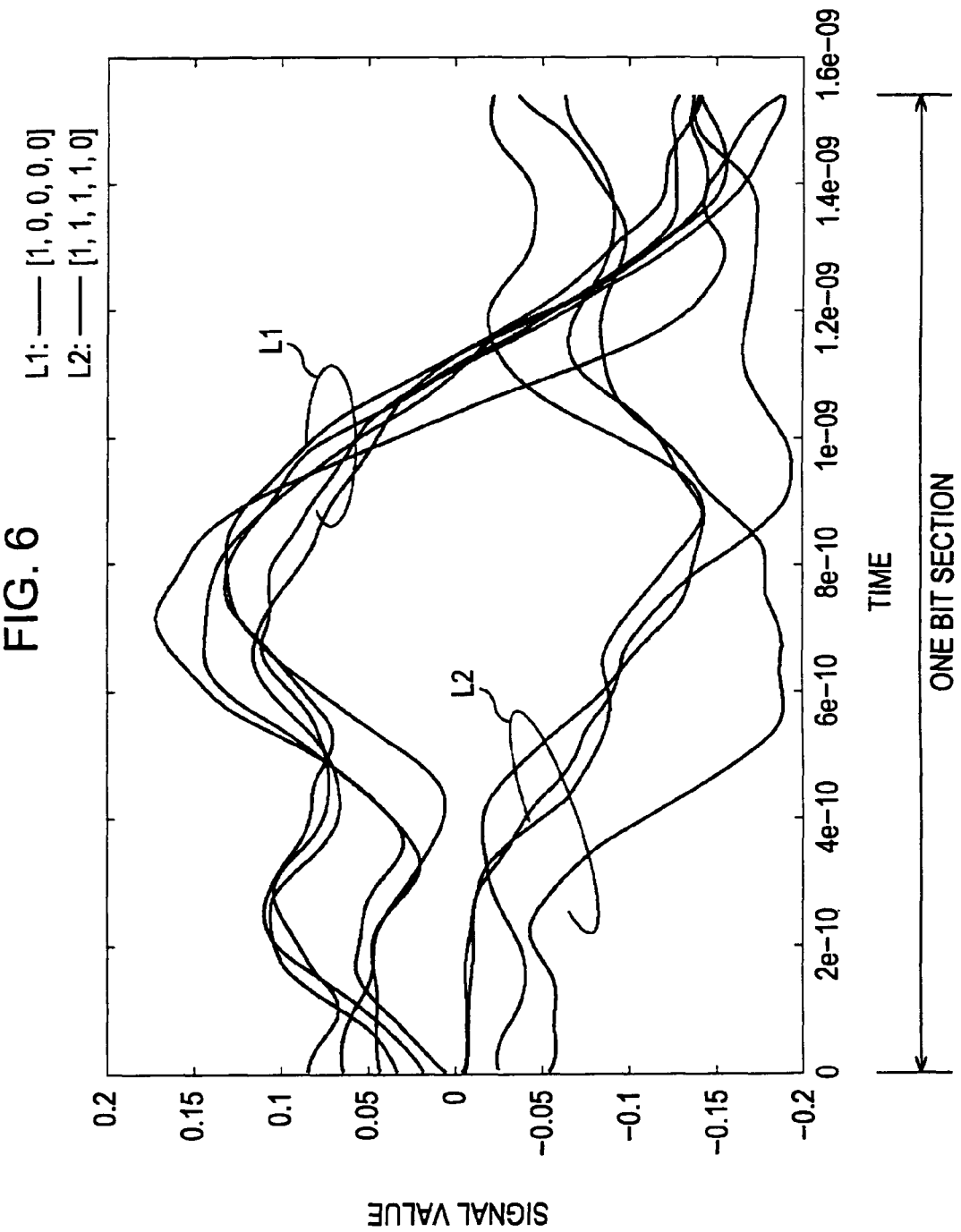

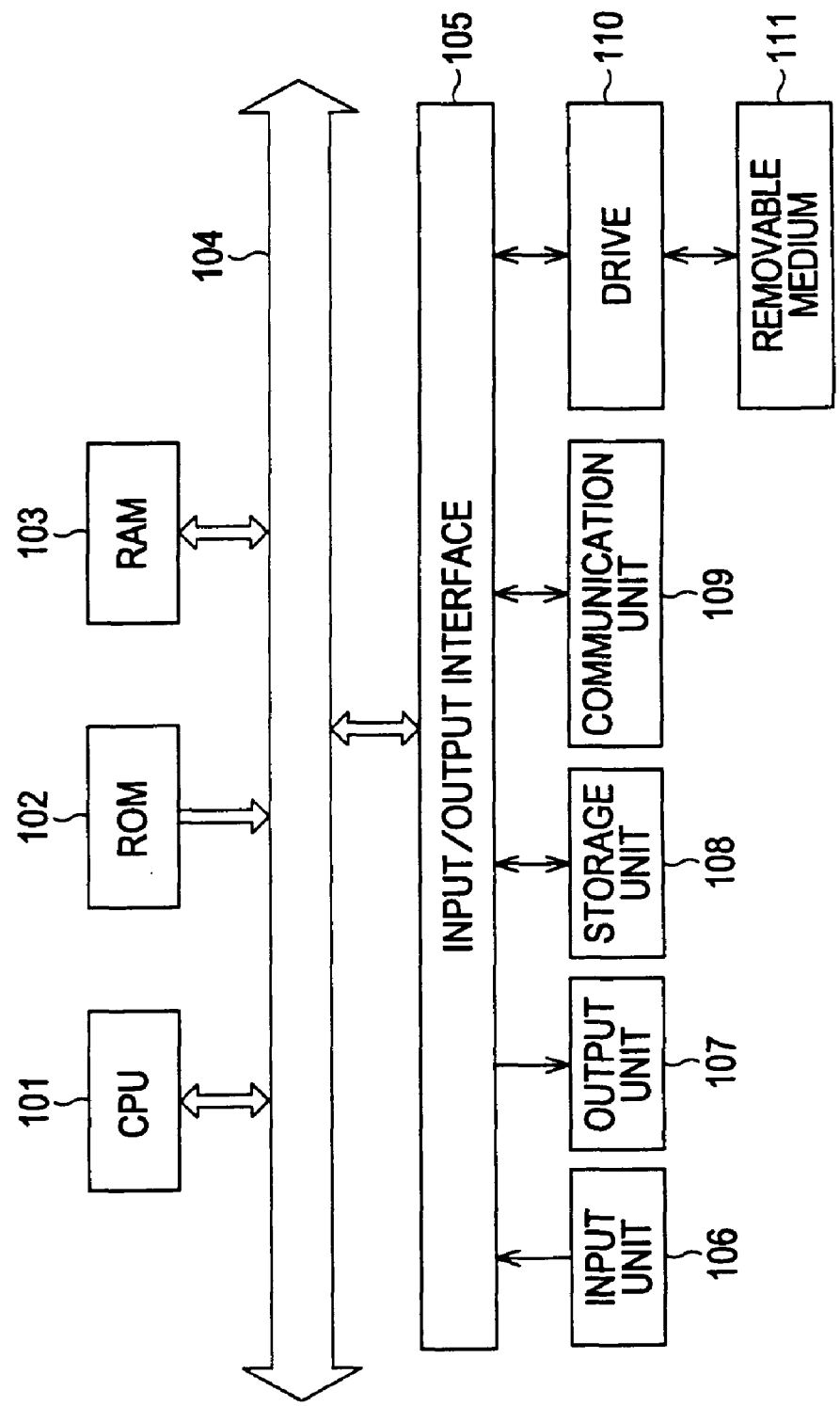

SIGNAL PROCESSING APPARATUS, SIGNAL PROCESSING METHOD, AND PROGRAM

CROSS REFERENCES TO RELATED APPLICATIONS

The present invention contains subject matter related to Japanese Patent Application JP 2006-350355 filed in the Japanese Patent Office on Dec. 26, 2006, the entire contents of which are incorporated herein by reference.

BACKGROUND OF THE INVENTION

1. Field of the Invention

The present invention relates to signal processing apparatuses, signal processing methods, and programs, and more particularly to a signal processing apparatus, a signal processing method, and a program for obtaining characteristics of the distorted waveform of a signal.

2. Description of the Related Art

For example, in the case where wireless communication is performed using electromagnetic waves (radio waves) between a plurality of boards included in a predetermined apparatus in a housing, an electromagnetic wave transmitted from a transmitter board is reflected from walls of the housing or diffracted by other boards, and a receiver board receives the same electromagnetic wave transmitted via a plurality of paths.

The phenomenon that the receiver board receives the same electromagnetic wave transmitted via a plurality of paths is referred to as "multipath". Multipath occurs not only in the housing, but also outside the housing due to obstacles, such as buildings and configuration of the ground.

In multipath, an electromagnetic wave is transmitted via a plurality of transmission paths having different distances, that is, a plurality of transmission paths involving different transmission times. Therefore, a signal value of a predetermined symbol of a signal received by the receiver board is affected by a plurality of symbols that are transmitted prior to the predetermined symbol and that are transmitted with delay via transmission paths with longer transmission times (i.e., electromagnetic wave interference).

In the case where a signal value of a predetermined symbol is affected by a plurality of symbols transmitted with delay, as has been described above, the waveform represented by the signal value of the predetermined symbol is distorted (multipath fading), and the receiver board has difficulty in accurately determining the values of the symbols of the signal. For example, the signal may not be accurately demodulated.

FIGS. 1A to 1H illustrate reception waveforms of electromagnetic waves in communication performed inside and outside a housing of a certain apparatus. The modulation scheme employed here is amplitude shift keying (ASK).

Four waveforms illustrated in FIGS. 1B, 1D, 1F, and 1H are reception waveforms obtained in communication performed inside the housing, and four waveforms illustrated in FIGS. 1A, 1C, 1E, and 1G are reception waveforms obtained in communication performed outside the housing. FIGS. 1A and 1B illustrate the reception waveforms at a transmission rate of 250 kbps. FIGS. 1C and 1D illustrate the reception waveforms at a transmission rate of 500 kbps. FIGS. 1E and 1F illustrate the reception waveforms at a transmission rate of 1 Mbps. FIGS. 1G and 1H illustrate the reception waveforms at a transmission rate of 2 Mbps.

For example, the most characteristic case illustrated in FIGS. 1G and 1H where the transmission rate is 2 Mbps will be discussed. The reception waveform outside the casing, which is illustrated in FIG. 1G, has "0" periods and "1" periods displayed well in order. In contrast, the reception waveform inside the housing, which is illustrated in FIG. 1H, is distorted since reflected waves overlap periods that should be "0", so that these periods may be highly likely to be determined as "1". In other words, the effects upon reception greatly differ depending on the transmission signal rate, and the quality of communication deteriorates significantly due to reflection from walls of the housing and the like.

Because of the effects of multipath fading, it is difficult to increase the communication path capacity and to maintain an arbitrary signal quality by performing simple signal processing.

In order to overcome the problems due to the foregoing effects of multipath fading, for example, the entire surface of the interior of the housing may be covered with an electromagnetic wave absorber, thereby suppressing reflection of electromagnetic waves from walls of the housing inside the housing (for example, see Japanese Unexamined Patent Application Publication No. 2004-220264). However, electromagnetic wave absorbers are expensive, and, in view of heat exhaustion, it is difficult to cover the entire surface of the interior of the housing with an electromagnetic wave absorber.

In order to handle the multipath effects in signal processing in general wireless communication of the related art, methods such as one using orthogonal frequency division multiplexing (OFDM), one using a spread-spectrum technique and rake reception, one using a multiantenna, and one using a waveform equalizer are available.

However, in the case where OFDM is employed as the modulation scheme, heavy load is placed on devices performing processing such as fast Fourier transform (FFT) and analog-to-digital and digital-to-analog conversion in modulation and demodulation, and these devices may exhaust more heat. In the case where a spread-spectrum technique is used, it is necessary to perform signal processing at a rate higher than the transmission signal rate, and high-speed communication becomes difficult to perform.

In the case where a multiantenna or a waveform equalizer is used, in view of the fact that the transmission characteristics may change according to time, changes in the transmission characteristics are difficult to predict, and noncorrelated noise may be superimposed on information to be transmitted, it becomes necessary to insert a unique word (UW) into a packet and to use a large-scale prediction circuit for improving the accuracy of predicting changes in the transmission characteristics. In the case where a multiantenna is used in a limited space inside the housing, cross-correlation occurs between the antennas, and it is regarded that no significant effects can be achieved to handle the multipath effects.

Even in the case where no effective measures can be taken against the multipath effects, as has been described above, if, for example, the characteristics of distortion of the waveform of a signal (statistical characteristics of multipath fading) in communication performed inside the housing can be obtained, the values of symbols of the signal can be accurately determined on the basis of the distortion characteristics, and it is expected that the quality of communication can be improved.

SUMMARY OF THE INVENTION

Characteristics of distortion of the waveform of a signal in communication performed inside a housing greatly differ from characteristics of distortion occurring in general wireless communication. Therefore, even when a fading model or an electromagnetic wave simulator used in such general wireless communication is employed, it is difficult to accurately obtain the characteristics of distortion of the waveform of the signal in communication performed inside the housing. Even in the case where the characteristics of distortion of the waveform of the signal in communication performed inside the housing are obtained from data obtained using a network analyzer, the results are significantly different depending on the performance and usage of an apparatus for processing the inverse FFT (iFFT). It is thus difficult to accurately obtain the characteristics of distortion of the waveform of the signal in communication performed inside the housing.

It is desirable to obtain characteristics of distortion of the waveform of a signal.

A signal processing apparatus according to an embodiment of the present invention is a signal processing apparatus configured to process a signal transmitted via a transmission path where a waveform represented by a signal value of a particular symbol is stationarily distorted in accordance with values of symbols transmitted prior to the particular symbol. The signal processing apparatus includes the following elements: receiving means for receiving a test signal which is the signal transmitted via the transmission path, the signal including symbols set to predetermined values; obtaining means for obtaining the signal value of the particular symbol from the test signal received by the receiving means; and characteristic computing means for computing a characteristic of distortion of the waveform represented by the signal value of the particular symbol in accordance with the values of the symbols transmitted prior to the particular symbol on the basis of waveforms represented by signal values obtained by the obtaining means from a plurality of test signals.

A signal processing method or a program according to another embodiment of the present invention is a signal processing method for processing a signal transmitted via a transmission path where a waveform represented by a signal value of a particular symbol is stationarily distorted in accordance with values of symbols transmitted prior to the particular symbol, or a program executed by a computer for controlling a signal processing apparatus configured to process a signal transmitted via a transmission path where a waveform represented by a signal value of a particular symbol is stationarily distorted in accordance with values of symbols transmitted prior to the particular symbol, the program allowing the computer to execute a process. The signal processing method or the process includes the steps of obtaining, from a test signal which is received via the transmission path and which is the signal including symbols set to predetermined values, the signal value of the particular symbol; and computing a characteristic of distortion of the waveform represented by the signal value of the particular symbol in accordance with the values of the symbols transmitted prior to the particular symbol on the basis of waveforms represented by signal values obtained from a plurality of test signals.

According to the embodiments of the present invention, a signal value of a particular symbol is obtained from a test signal which is received via a transmission path and which is a signal including symbols set to predetermined values. On the basis of waveforms represented by signal values obtained from a plurality of test signals, a characteristic of distortion of the waveform represented by the signal value of the particular symbol is obtained.

According to the embodiments of the present invention, a characteristic of distortion of the waveform of a signal can be obtained.

BRIEF DESCRIPTION OF THE DRAWINGS

FIGS. 5A and 5B illustrate distortion of the waveform of a signal received by a large-scale integrated (LSI) circuit 17;

FIG. 6 illustrates distortion of the waveform of a signal received by the LSI circuit 17;

FIG. 18 is a block diagram of an exemplary structure of a personal computer.

DESCRIPTION OF THE PREFERRED EMBODIMENTS

Figure 1A:
FIGS. 1A to 1H illustrate reception waveforms of electromagnetic waves obtained in communication performed inside and outside a housing.
Figure 1B:
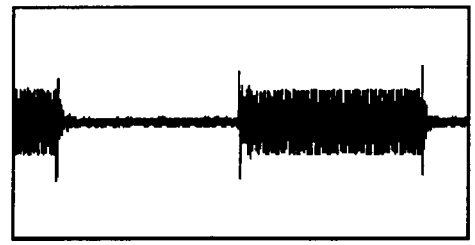
Figure 1C:
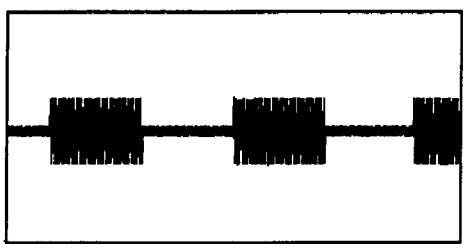
Figure 1D:
Figure 1E:
Figure 1F:
Figure 1G:
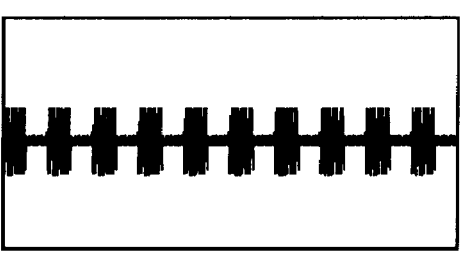
Figure 1H:

Before describing an embodiment of the present invention, the correspondence between the features of the claims and the embodiment disclosed in the specification or shown in the drawings is discussed below. This description is intended to assure that the embodiment supporting the claimed invention is described in the specification or shown in the drawings. Thus, even if an element in the following embodiment is described in the specification or shown in the drawings, but is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figure 7:
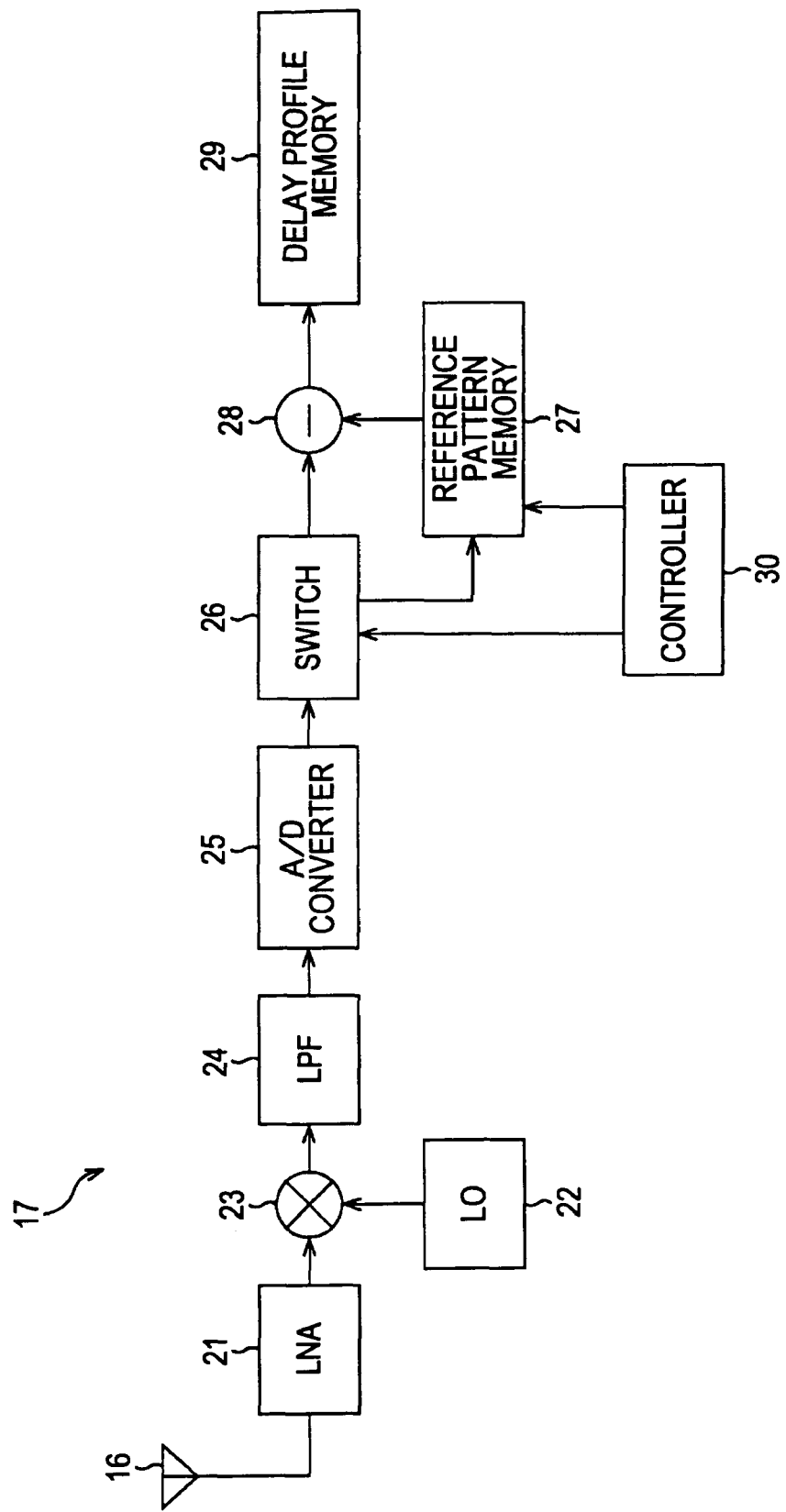
FIG. 7 is a block diagram of an exemplary structure of the LSI circuit 17.

A signal processing apparatus according to an embodiment of the present invention is a signal processing apparatus configured to process a signal transmitted via a transmission path where a waveform represented by a signal value of a particular symbol is stationarily distorted in accordance with values of symbols transmitted prior to the particular symbol, including the following elements: receiving means (e.g., an antenna 16 shown in FIG. 7) for receiving a test signal which is the signal including symbols set to predetermined values via the transmission path; obtaining means (e.g., an analog-to-digital (A/D) converter 25 shown in FIG. 7) for obtaining the signal value of the particular symbol from the test signal received by the receiving means; and characteristic computing means (a reference pattern memory 27 and a subtracter 28 shown in FIG. 7) for computing a characteristic of distortion of the waveform represented by the signal value of the particular symbol in accordance with the values of the symbols transmitted prior to the particular symbol on the basis of waveforms represented by signal values obtained by the obtaining means from a plurality of test signals.

In the signal processing apparatus according to the embodiment, the characteristic computing means may include storage means (e.g., the reference pattern memory 27 shown in FIG. 7) for storing a waveform represented by a signal value obtained from, among the plurality of test signals, a reference test signal serving as a predetermined reference, and subtracting means (e.g., the subtracter 28 shown in FIG. 7) for subtracting the waveform stored in the storage means from a waveform represented by a signal value obtained from, among the plurality of test signals, a test signal other than the reference test signal, and obtaining a waveform generated as a result of the subtraction as the characteristic of the distortion.

In the signal processing apparatus according to the embodiment, the characteristic computing means may include a classification unit (e.g., a classification unit 54 shown in FIG. 14) configured to classify the plurality of test signals into predetermined classes on the basis of the values of the symbols of each of the plurality of test signals, and a learning unit (e.g., a learning unit shown in FIG. 14) configured to obtain the characteristic of the distortion by performing learning using a least squares method for each of the classes into which classification is performed by the classification unit on the basis of student data serving as a student and teacher data serving as a teacher in learning the characteristic of the distortion, the student data being the values of the symbols of each of the plurality of test signals, and the teacher data being the signal value of the particular symbol of each of the plurality of test signals, which is obtained by the obtaining means.

The signal processing apparatus according to the embodiment may further include combining means (e.g., an adder 44 shown in FIG. 12) for combining characteristics of distortion obtained by the characteristic computing means from the plurality of test signals and estimating distortion of a waveform represented by a signal value of a particular symbol of a signal including symbols set to arbitrary values, the distortion being caused by symbols transmitted prior to the particular symbol.

A signal processing method or a program according to another embodiment of the present invention is a signal processing method for processing a signal transmitted via a transmission path where a waveform represented by a signal value of a particular symbol is stationarily distorted in accordance with values of symbols transmitted prior to the particular symbol, or a program executed by a computer for controlling a signal processing apparatus configured to process a signal transmitted via a transmission path where a waveform represented by a signal value of a particular symbol is stationarily distorted in accordance with values of symbols transmitted prior to the particular symbol, the program allowing the computer to execute a process. The signal processing method or the process includes the steps of obtaining, from a test signal which is received via the transmission path and which is the signal including symbols set to predetermined values, the signal value of the particular symbol (e.g., step S12 shown in FIG. 9); and computing a characteristic of distortion of the waveform represented by the signal value of the particular symbol in accordance with the values of the symbols transmitted prior to the particular symbol on the basis of waveforms represented by signal values obtained from a plurality of test signals (e.g., step S16 shown in FIG. 9).

A specific embodiment of the present invention will now herein be described in detail below with reference to the drawings.

Figure 2:
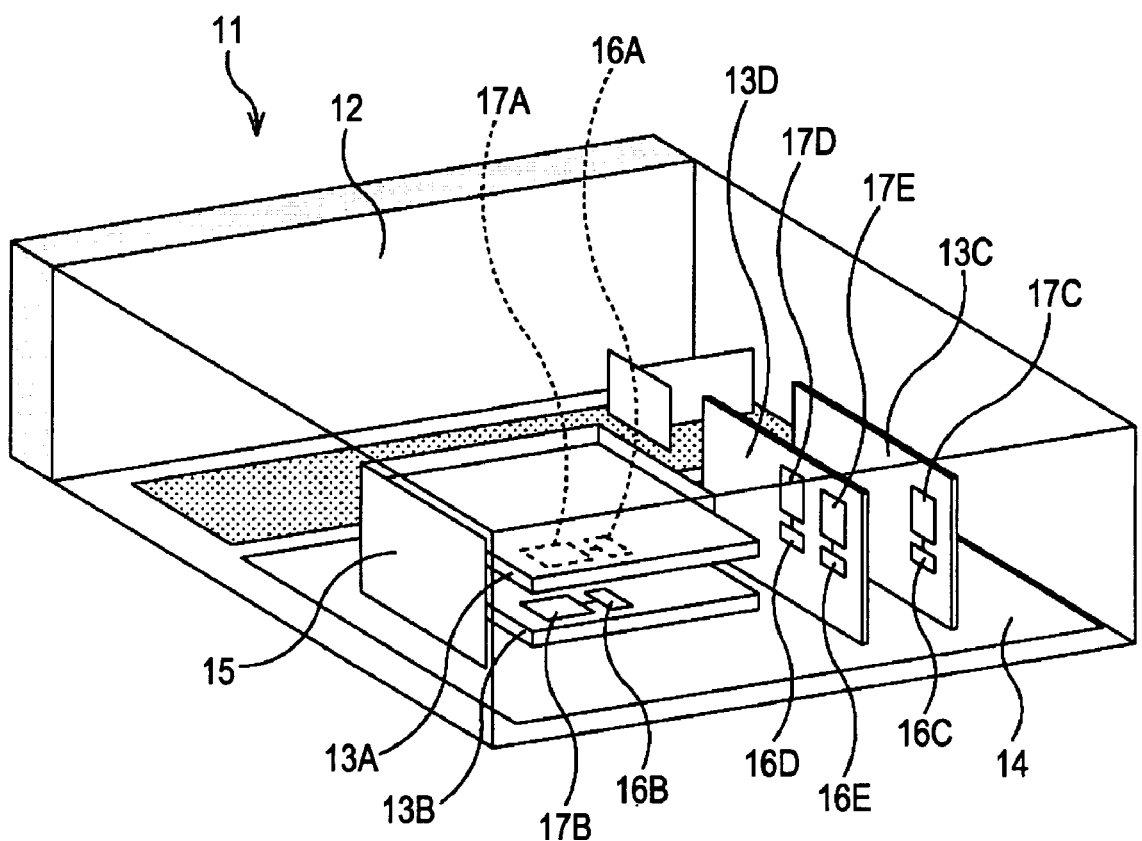
FIG. 2 is a perspective view of an exemplary structure of a signal processing apparatus according to an embodiment of the present invention.

FIG. 2 is a perspective view of an exemplary structure of a signal processing apparatus according to an embodiment of the present invention.

Referring to FIG. 2, a signal processing apparatus 11 includes a housing 12, signal processing boards 13A to 13D, a platform board 14, and a board fixture 15.

The housing 12 is a rectangular parallelepiped and contains the signal processing boards 13A to 13D, the platform board 14, and the board fixture 15.

The signal processing boards 13A to 13D apply signal processing on signals including image signals and audio signals input from, for example, an external device (not shown) to the signal processing apparatus 11.

The signal processing boards 13A to 13D each include at least one antenna for transmitting and receiving electromagnetic waves (radio waves) and at least one LSI circuit having a wireless communication function and performs wireless communication with each other. That is, the signal processing board 13A has an antenna 16A and an LSI circuit 17A; the signal processing board 13B has an antenna 16B and an LSI circuit 17B; the signal processing board 13C has an antenna 16C and an LSI circuit 17C; and the signal processing board 13D has an antenna 16D, an antenna 16E, an LSI circuit 17D, and an LSI circuit 17E.

Electrical wiring for supplying power from, for example, a power supply module (not shown) to the signal processing boards 13A to 13D is provided on the platform board 14. The signal processing boards 13A and 13B are mounted onto the platform board 14 via the board fixture 15, and the signal processing boards 13C and 13D are directly mounted onto the platform board 14.

The board fixture 15 is a fixture for mounting the signal processing boards 13A and 13B onto the platform board 14.

The board arrangement, the setting method, and the number of boards shown in FIG. 2 are only exemplary and are not limited to those described above with reference to FIG. 2.

The antennas 16A to 16E transmit and receive electromagnetic waves for allowing the signal processing boards 13A to 13D to perform wireless communication with each other.

The LSI circuits 17A to 17E are connected to the antennas 16A to 16E, respectively. The LSI circuits 17A to 17E perform wireless communication via the antennas 16A to 16E, respectively.

The LSI circuits 17A to 17E have the same or similar structure. If it is not necessary to distinguish the LSI circuits 17A to 17E in the following description, the LSI circuits 17A to 17E are collectively referred to as the LSI circuit(s) 17. Similarly, the antennas 16A to 16E connected to the LSI circuits 17A to 17E are collectively referred to as the antenna(s) 16.

Radio waves emitted inside the housing 12 are affected by noise including white noise (thermal noise) existing inside the housing 12 and colored noise (noise emitted from the LSI circuits) and multipath effects due to electromagnetic waves reflected from walls of the housing 12 and electromagnetic waves reflected from and diffracted by the boards. As a result, the waveform represented by signal values of a signal is distorted.

Figure 3A:
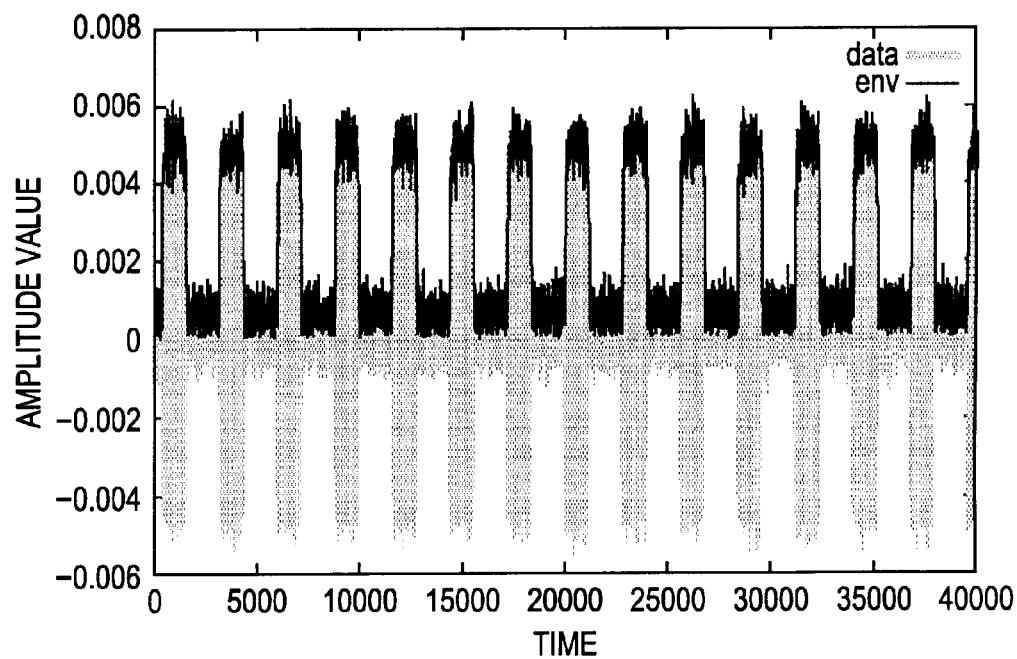
FIG. 3A illustrates transmission waveforms.
Figure 3B:
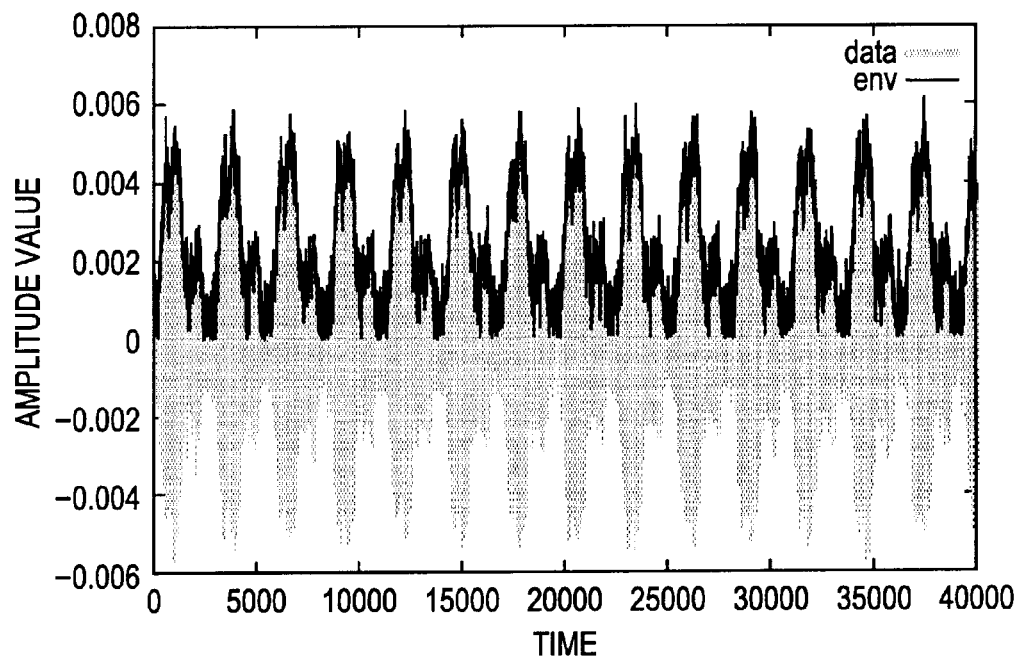
FIG. 3B illustrates reception waveforms.

FIG. 3A illustrates the waveforms (transmission waveforms) of electromagnetic waves transmitted by a transmitting one of the LSI circuits 17 (hereinafter referred to as a "transmitter LSI circuit 17"), and FIG. 3B illustrates the waveforms (reception waveforms) of the electromagnetic waves received by a receiving one of the LSI circuits 17 (hereinafter referred to as a "receiver LSI circuit 17") receiving the transmission waveforms.

Referring to FIGS. 3A and 3B, the axis of abscissa represents time, and the axis of ordinate represents the amplitude value of an electromagnetic wave transmitting a signal. Gray lines represent transmitted/received electromagnetic waves (data), and black lines represent the waveforms of the envelopes of transmitted/received electromagnetic waves (env). The signal modulation scheme used here is ASK.

As is clear from FIGS. 3A and 3B, in the case where a signal transmitted from the transmitter LSI circuit 17 is received by the receiver LSI circuit 17, the waveforms of the electromagnetic waves are distorted.

Figure 4A:
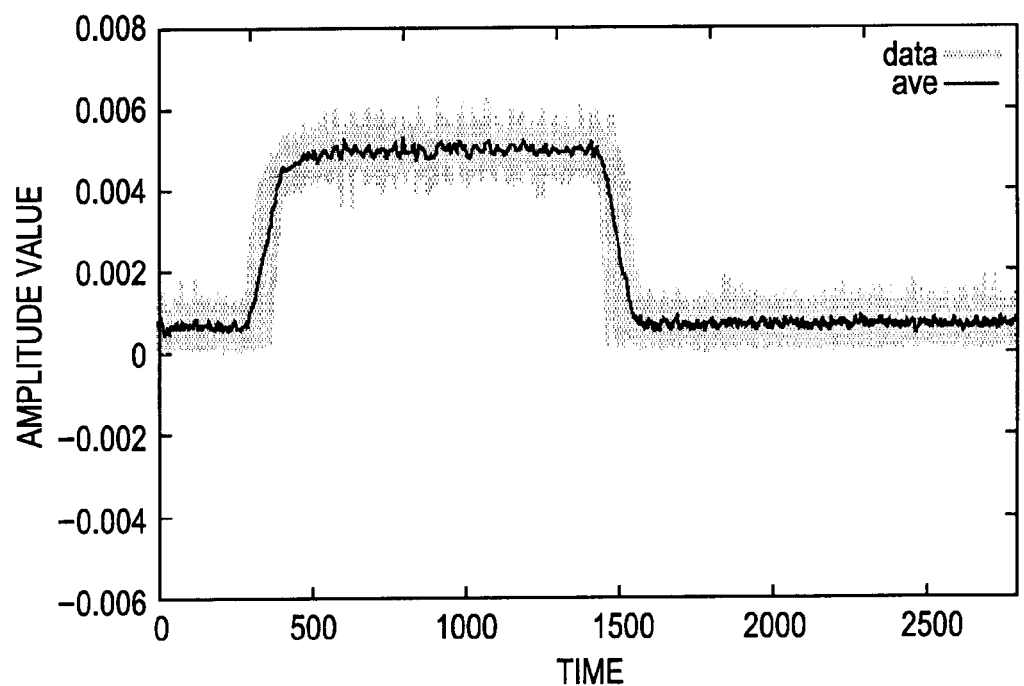
FIG. 4A illustrates transmission waveforms.
Figure 4B:
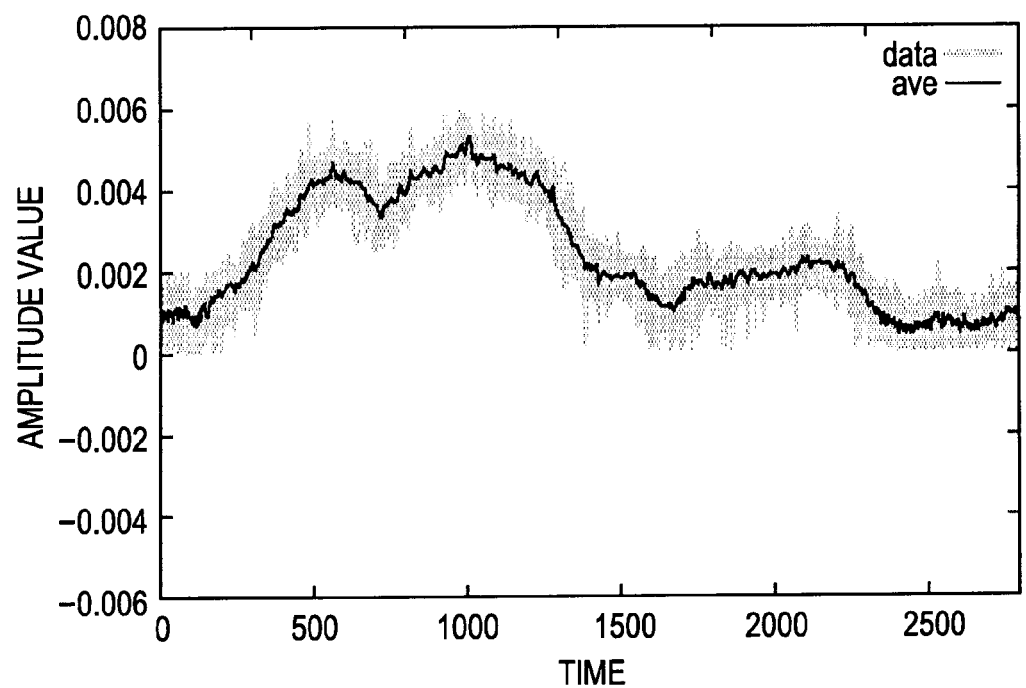
FIG. 4B illustrates reception waveforms, in which envelopes of the transmission and reception waveforms are shifted in phase and displayed over one another.

Next, FIG. 4A illustrates fourteen transmission waveforms, and FIG. 4B illustrates fourteen reception waveforms, which are illustrated in FIGS. 3A and 3B, in which the envelopes thereof are shifted in phase and displayed over one another. Gray lines in FIGS. 4A and 4B represent the fourteen waveforms (data), and black lines represent the average waveform (env) of the fourteen waveforms.

As shown in FIGS. 4A and 4B, the distortion of the fourteen reception waveforms due to the multipath effects in communication inside the housing 12, which are displayed over one another, is similar in shape and does not change over time. That is, the reception waveforms are distorted stationarily. It is also understood from FIGS. 4A and 4B that reflection waves generated inside the housing 12 pass similar transmission paths and have only a limited amount of effect on the reception waveforms over a relatively short period of time.

In communication inside the housing 12, the reception waveforms are stationarily distorted by the multipath effects, and the LSI circuits 17 obtain the distortion characteristics.

With reference to FIGS. 5A, 5B, and 6, the distortion of the waveform of a signal received by the LSI circuit 17 will now be described.

A signal transmitted/received in wireless communication includes a plurality of symbols. Depending on the modulation scheme, one symbol may transmit a plurality of bits. In the following description, as in, for example, binary phase shift keying (BPSK), an example where one symbol transmits one bit (0 or 1) will be described.

FIGS. 5A and 5B illustrate, among signals received by the LSI circuit 17, 5-bit signals each including a particular bit (hereinafter referred to as a "current bit" if necessary) and previous four bits transmitted prior to the current bit. These bits including the current bit and the previous four bits are represented as "the fourth previous bit, the third previous bit, the second previous bit, the first previous bit, and the current bit". FIG. 5A illustrates a 5-bit signal "1, 0, 0, 0, 0", and FIG. 5B illustrates a 5-bit signal "1, 1, 1, 1, 0".

In FIGS. 5A and 5B, arrows directed from the previous four bits to the current bit indicate that the previous four bits are reflected from walls of the housing 12 and reflected from and diffracted by the boards, and hence the previous four bits are transmitted with delay and superimposed on the current bit.

The current bit is 0 in both FIGS. 5A and 5B. The case in which the bits transmitted prior to the current bit are "1, 0, 0, 0" and the case in which the bits transmitted prior to the current bit are "1, 1, 1, 1" have different bit patterns. As a result, the current bit is affected differently. In other words, the waveform of the current bit is distorted differently.

That is, FIG. 6 illustrates the waveform of the current bit in the case where the 5-bit signal "1, 0, 0, 0, 0" is transmitted, and the waveform of the current bit in the case where the 5-bit signal "1, 1, 1, 1, 0" is transmitted. Referring to FIG. 6, the axis of abscissa represents time, that is, time of one bit which is the current bit, and the axis of ordinate represents the signal value of a signal.

More specifically, FIG. 6 illustrates a waveform group L1 of the current bit sampled in the case where the 5-bit signal "1, 0, 0, 0, 0" is transmitted a plurality of times, and a waveform group L2 of the current bit sampled in the case where the 5-bit signal "1, 1, 1, 1, 0" is transmitted a plurality of times.

As shown in FIG. 6, the waveform groups L1 and L2 have significantly different direct-current (DC) offset positions and waveform shapes. In contrast, it is clear from FIG. 6 that the waveforms of the waveform group L1 and the waveforms of the waveform group L2 do not have significantly different waveform shapes. The distortion of the waveforms of each waveform group has similar characteristics.

Therefore, the LSI circuits 17 shown in FIG. 2 transmit/receive each signal having bits arranged in a bit pattern and set to predetermined values (hereinafter referred to as a "test pattern signal" if necessary), such as "1, 0, 0, 0, 0" or "1, 1, 1, 1, 0", a plurality of times and applies statistical processing on the waveforms of the current bit obtained as a result, thereby obtaining characteristics of the distortion of the waveform represented by the signal value of the current bit in accordance with the values of a plurality of bits transmitted prior to the current bit (hereinafter referred to as a "delay profile" if necessary).

FIG. 7 is a block diagram of an exemplary structure of the LSI circuit 17.

Referring to FIG. 7, the LSI circuit 17 includes a low noise amplifier (LNA) 21, a local oscillator (LO) 22, a multiplier 23, a low pass filter (LPF) 24, an analog-to-digital (A/D) converter 25, a switch 26, a reference pattern memory 27, a subtracter 28, a delay profile memory 29, and a controller 30.

The LNA 21 is connected to the antenna 16 (FIG. 2). An RF signal received by the antenna 16 is supplied to the LNA 21. The LNA 21 amplifies the RF signal supplied from the antenna 16 with low noise and supplies the amplified RF signal to the multiplier 23.

The LO 22 generates a signal with a predetermined frequency for converting the RF signal received by the antenna 16 into a baseband signal and supplies the signal generated to the multiplier 23.

The multiplier 23 multiplies the RF signal supplied from the LNA 21 by the signal with the predetermined frequency, which is supplied from the LO 22, to generate a baseband signal and supplies the baseband signal to the LPF 24.

The LPF 24 smoothes the baseband signal supplied from the multiplier 23 and supplies the smoothed signal to the A/D converter 25.

A circuit including the LNA 21, the LO 22, the multiplier 23, and the LPF 24 is a general circuit. When transmitting a signal using a spread-spectrum technique or the like, matched filtering or the like is performed to generate a baseband signal.

The A/D converter 25 performs A/D conversion of the baseband signal supplied from the LPF 24 and obtains values generated as a result of the A/D conversion as signal values of bits (may also be referred to as "bit signal values") represented by a signal transmitted from another LSI circuit 17. The waveforms represented by the bit signal values obtained by the A/D converter 25 are, for example, shown in FIG. 6. The A/D converter 25 sequentially supplies the signal values of the bits to the switch 26.

Under control of the controller 30, the switch 26 supplies the signal value of the current bit, which is one of the bit signal values supplied from the A/D converter 25 and which is obtained from a test pattern signal transmitted from another LSI circuit 17, to the reference pattern memory 27 or the subtracter 28.

Hereinafter, of test pattern signals, a signal having all bits being 1 or 0 is referred to as a reference test pattern signal, and test pattern signals other than the reference test pattern signal are referred to as other test pattern signals. If the test pattern signal is a reference test pattern signal, the switch 26 under control of the controller 30 supplies the signal value of the current bit to the reference pattern memory 27. If the test pattern signal is one of the other test pattern signals, the switch 26 under control of the controller 30 supplies the signal value of the current bit to the subtracter 28.

The reference pattern memory 27 stores the bit signal value supplied from the switch 26, that is, the signal value of the current bit obtained from the reference test pattern signal. Under control of the controller 30, the reference pattern memory 27 supplies the bit signal value stored therein to the subtracter 28.

The subtracter 28 subtracts, from the bit signal value supplied from the switch 26, the bit signal value supplied from the reference pattern memory 27, and supplies the waveform represented by the difference as a delay profile to the delay profile memory 29.

That is, as has been described above, the LSI circuits 17 transmit/receive test pattern signals to obtain a delay profile. The waveform represented by the signal value of the current bit is distorted not only by, for example, the effects of delayed bit transmission, but also by the effects of noise existing inside the housing 12. For example, the waveform represented by the signal value of the current bit obtained from a reference test pattern having all bits being 0 is distorted by the effects of noise existing inside the housing 12. By subtracting the waveform obtained from the reference pattern signal from the waveform obtained from one of the other test pattern signals using the subtracter 28, the effects of noise are eliminated, and a delay profile is obtained, which shows characteristics of the distortion of the waveform represented by the signal value of the current bit in accordance with the values of a plurality of bits transmitted prior to the current bit.

The delay profile memory 29 stores the delay profile supplied from the subtracter 28.

The controller 30 controls the components of the LSI circuit 17. The controller 30 stores a protocol for communicating with other LSI circuits 17. The protocol includes settings such as transmission/reception timing of test pattern signals, the setting whether the reference test pattern signal has all bits being 1 or 0, and bit patterns of the other test pattern signals.

For example, the controller 30 controls the switch 26 on the basis of the protocol. If the test pattern signal is a reference pattern signal, the controller 30 allows the switch 26 to supply the signal value of the current bit to the reference pattern memory 27. If the test pattern signal is one of the other test pattern signals, the controller 30 allows the switch 26 to supply the signal value of the current bit to the subtracter 28.

If the test pattern signal is one of the other test pattern signals, the controller 30 controls the reference pattern memory 27 so that the reference pattern memory 27 supplies the signal value stored therein, that is, the signal value of the current bit obtained from the reference test pattern signal, to the subtracter 28.

Figure 8:
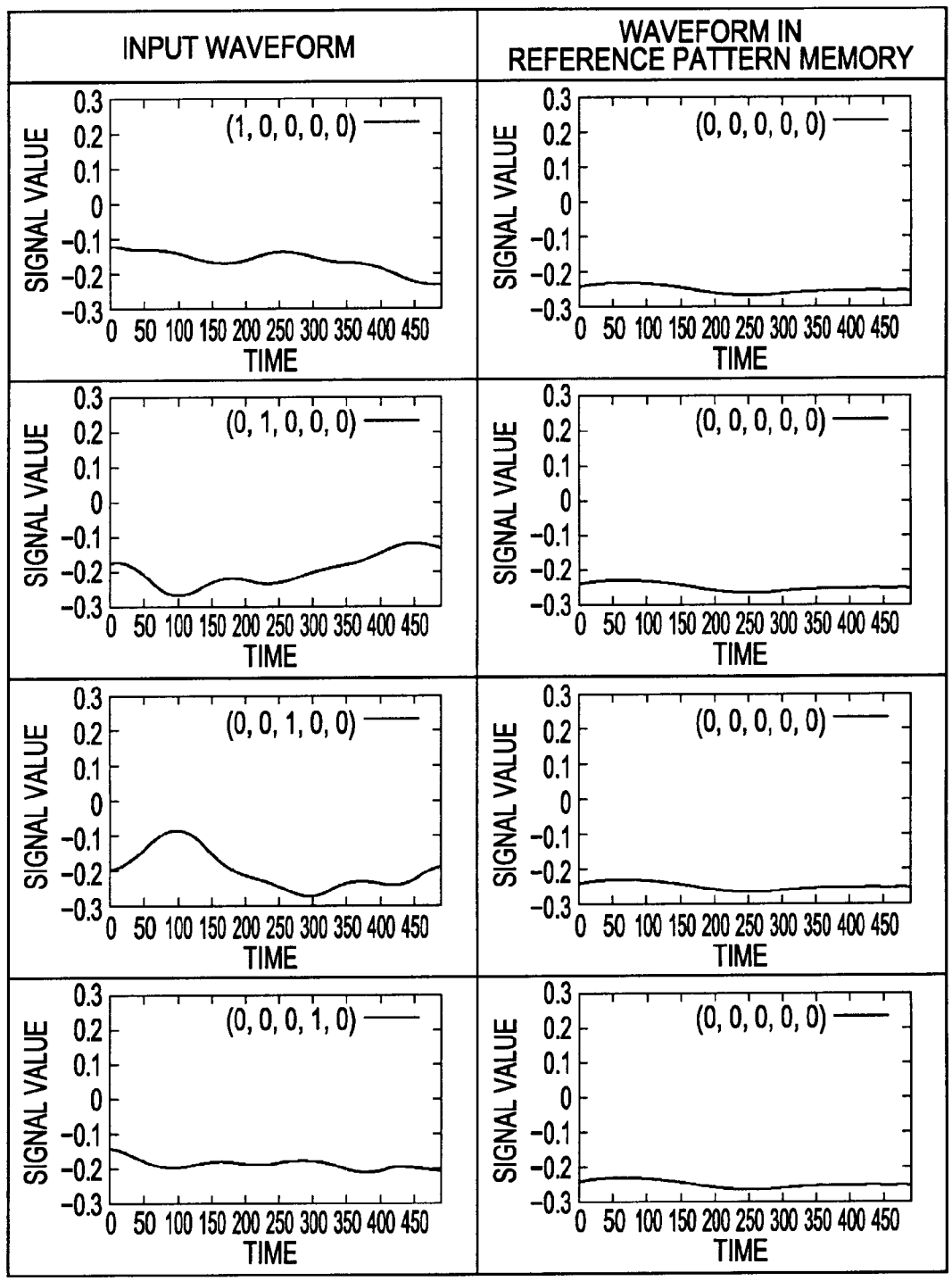
FIG. 8 illustrates waveforms obtained from test pattern signals.

FIG. 8 illustrates waveforms (input waveforms) represented by signal values supplied from the switch 26 to the subtracter 28 and waveforms represented by signal values stored in the reference pattern memory 27.

The waveforms illustrated in FIG. 8 are obtained when the reference test pattern signal "0, 0, 0, 0, 0" is used, and the other test pattern signals "1, 0, 0, 0, 0", "0, 1, 0, 0, 0", "0, 0, 1, 0, 0", and "0, 0, 0, 1, 0" are used.

The top left in FIG. 8 illustrates the waveform of the current bit obtained from the test pattern signal "1, 0, 0, 0, 0". The top right illustrates the waveform of the current bit obtained from the reference test pattern signal "0, 0, 0, 0, 0". The difference between these two waveforms is a delay profile showing effects on the waveform of the current bit caused by delayed transmission of bit "1", which is transmitted four bits before the current bit.

The second from the top left in FIG. 8 illustrates the waveform of the current bit obtained from the test pattern signal "0, 1, 0, 0, 0". The second from the top right illustrates the waveform of the current bit obtained from the reference test pattern signal "0, 0, 0, 0, 0". The difference between these two waveforms is a delay profile showing effects on the waveform of the current bit caused by delayed transmission of bit "1", which is transmitted three bits before the current bit.

The third from the top left in FIG. 8 illustrates the waveform of the current bit obtained from the test pattern signal "0, 0, 1, 0, 0". The third from the top right illustrates the waveform of the current bit obtained from the reference test pattern signal "0, 0, 0, 0, 0". The difference between these two waveforms is a delay profile showing effects on the waveform of the current bit caused by delayed transmission of bit "1", which is transmitted two bits before the current bit.

The fourth from the top left (bottom left) in FIG. 8 illustrates the waveform of the current bit obtained from the test pattern signal "0, 0, 0, 1, 0". The fourth from the top right (bottom right) illustrates the waveform of the current bit obtained from the reference test pattern signal "0, 0, 0, 0, 0". The difference between these two waveforms is a delay profile showing effects on the waveform of the current bit caused by delayed transmission of bit "1", which is transmitted one bit before the current bit.

Figure 9:
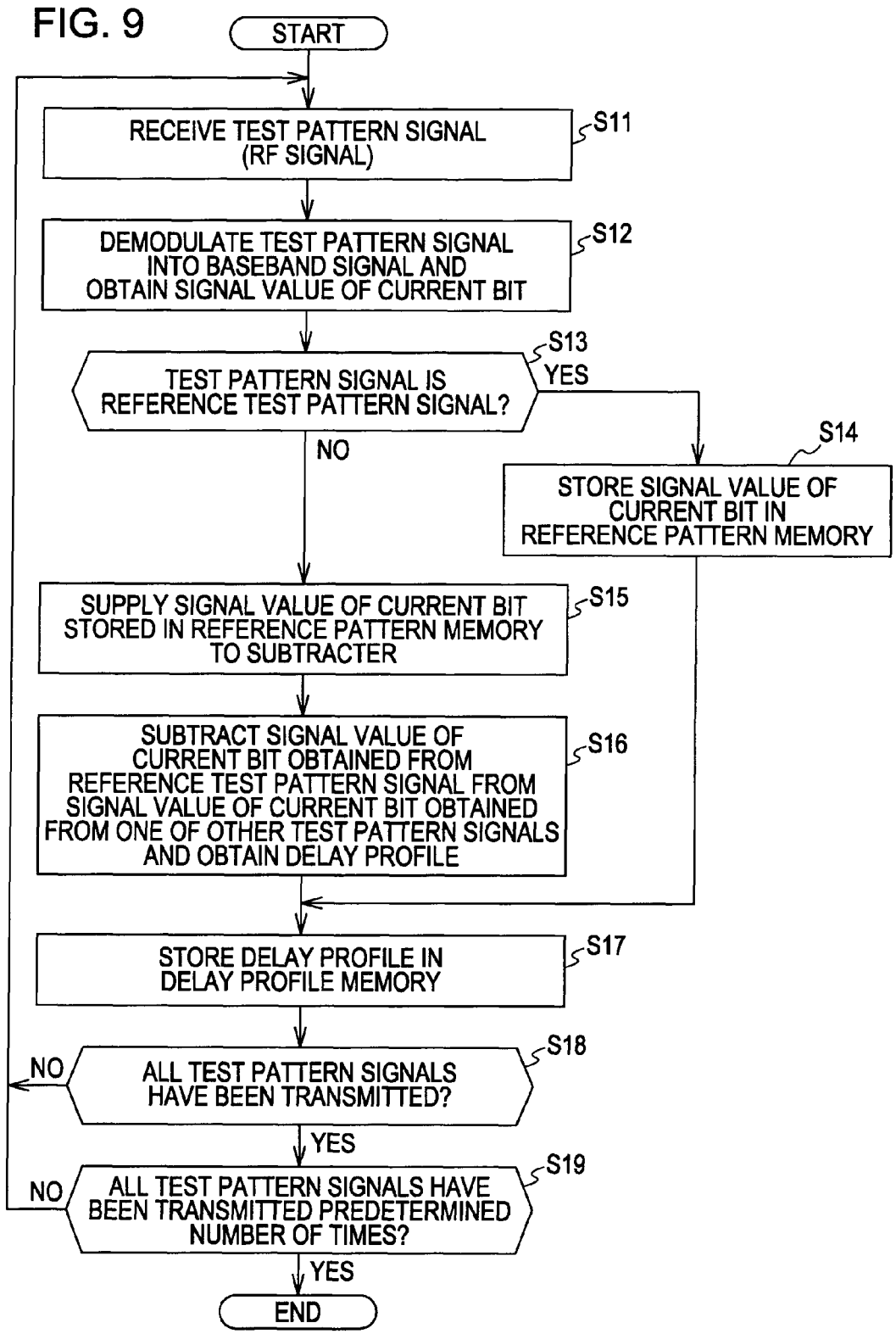
FIG. 9 is a flowchart of a process of obtaining delay profiles using the LSI circuit 17.

FIG. 9 is a flowchart of a process of obtaining delay profiles using the LSI circuit 17 shown in FIG. 7.

In the case where a test pattern signal (RF signal) is transmitted from another LSI circuit 17, in step S11, the antenna 16 receives the test pattern signal and supplies the test pattern signal to the LNA 21. The flow proceeds to step S12.

In step S12, the test pattern signal is demodulated into a baseband signal, and the baseband signal is supplied to the A/D converter 25. The A/D converter 25 converts the test pattern signal into a digital signal, which is obtained as signal values of bits represented by the test pattern signal, and supplies the signal values to the switch 26.

After the processing in step S12, the flow proceeds to step S13. The controller 30 determines whether the test pattern signal transmitted from the other LSI circuit 17 is a reference test pattern signal on the basis of the above-described protocol.

In the case where the controller 30 determines in step S13 that the test pattern signal transmitted from the other LSI circuit 17 is a reference test pattern signal, the flow proceeds to step S14, and the controller 30 controls the switch 26 to supply, of the bit signal values supplied from the A/D converter 25, the signal value of the current bit to the reference pattern memory 27. Accordingly, the reference pattern memory 27 stores the signal value of the current bit, which is obtained from the reference test pattern signal.

In contrast, in the case where the controller 30 determines in step S13 that the test pattern signal transmitted from the other LSI circuit 17 is not a reference test pattern signal, the flow proceeds to step S15.

In step S15, the controller 30 supplies the signal value stored in the reference pattern memory 27 in step S14, that is, the signal value of the current bit obtained from the reference test pattern signal, to the subtracter 28, and the flow proceeds to step S16.

In step S16, the controller 30 controls the switch 26 to supply, of the bit signal values supplied from the A/D converter 25, the signal value of the current bit, that is, the signal value of the current bit obtained from the other test pattern signal, to the subtracter 28.

The subtracter 28 subtracts the signal value of the current bit, which is supplied in step S15 from the reference pattern memory 27 and which is obtained from the reference test pattern signal, from the signal value of the current bit, which is supplied from the switch 26 and which is obtained from the other test pattern signal, and obtains the difference as a delay profile.

After the processing in step S16, the flow proceeds to step S17, and the subtracter 28 supplies the delay profile obtained in step S16 to the delay profile memory 29, and the delay profile memory 29 stores the delay profile. After the processing in step S14, the flow proceeds to step S17. In this case, the signal value stored in the reference pattern memory 27 is supplied as a delay profile obtained from the reference test pattern signal to the delay profile memory 29.

After the processing in step S17, the flow proceeds to step S18, and the controller 30 determines whether all test pattern signals that have been set to be transmitted from the other LSI circuit 17 have been transmitted on the basis of the above-described protocol.

For example, as shown in FIG. 8, in the case where the reference test pattern signal "0, 0, 0, 0, 0" is used, and the other test pattern signals "1, 0, 0, 0, 0", "0, 1, 0, 0, 0", "0, 0, 1, 0, 0", and "0, 0, 0, 1, 0" are used, the controller 30 determines whether all the five test pattern signals have been transmitted.

In the case where the controller 30 determines in step S18 that not all the test pattern signals have been transmitted, the flow returns to step S11, and the similar processing is repeated from step S11 onward. In contrast, in the case where the controller 30 determines in step S18 that all the test pattern signals have been transmitted, the flow proceeds to step S19.

In step S19, the controller 30 determines whether all the test pattern signals that have been set to be transmitted from the other LSI circuit 17 have been transmitted a predetermined number of times on the basis of the above-described protocol. That is, all the test pattern signals are transmitted a predetermined number of times, thereby obtaining the predetermined number of waveforms from each of the test pattern signals. By applying statistical processing on the predetermined number of waveforms obtained from each of the test pattern signals, the accuracy of a delay profile obtained from each of the test pattern signals can be improved.

In the case where the controller 30 determines in step S19 that not all of the test pattern signals have been transmitted the predetermined number of times, the flow returns to step S11, and the similar processing is repeated from step S11 onward. In contrast, in the case where the controller 30 determines in step S19 that all the test pattern signals have been transmitted the predetermined number of times, the flow ends.

As have been described above, the LSI circuit 17 can obtain a delay profile showing characteristics of distortion of the waveform represented by the signal value of the current bit in accordance with the values of bits of each test pattern signal.

Figure 10:
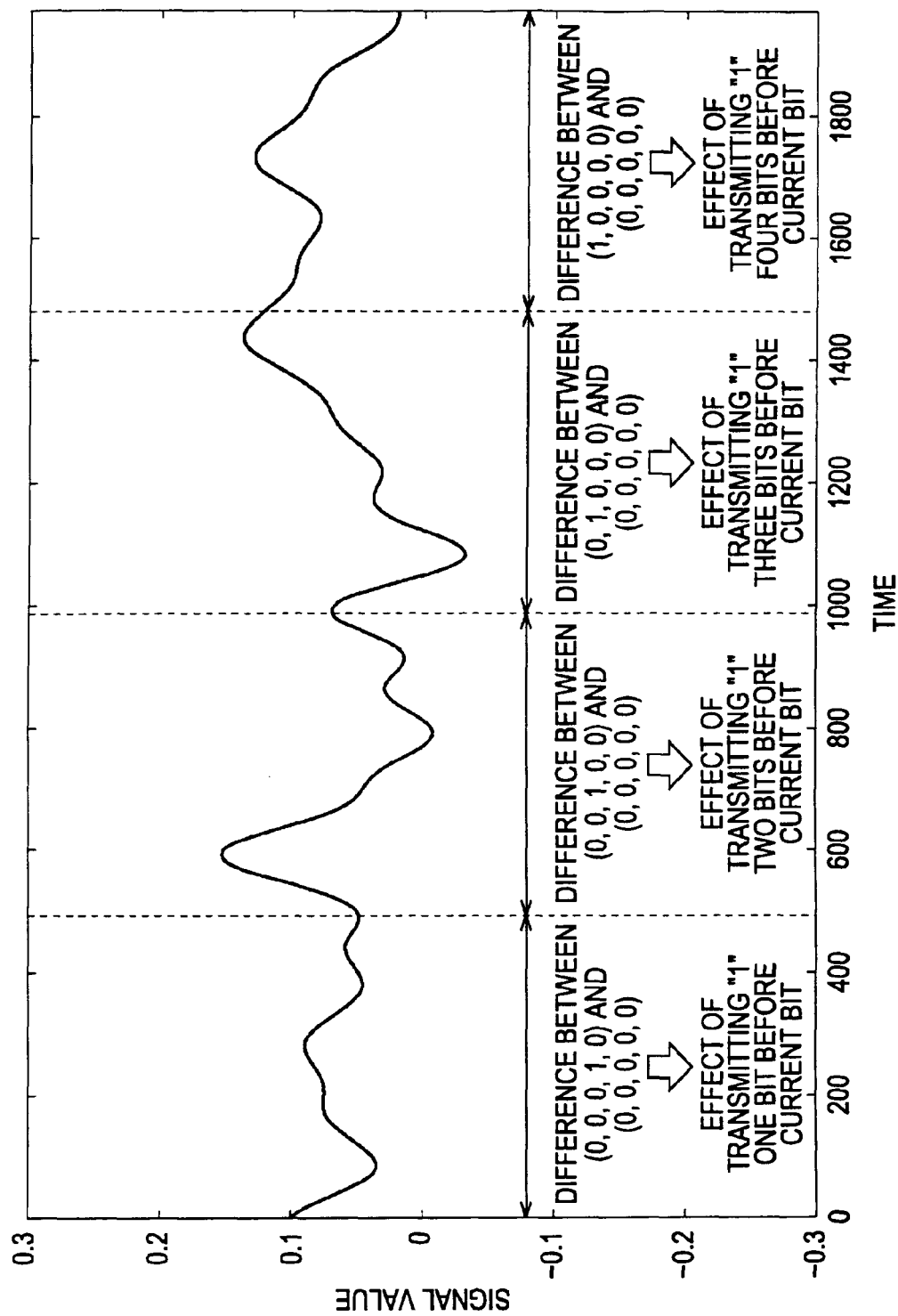
FIG. 10 illustrates exemplary delay profiles obtained by the LSI circuit 17.

FIG. 10 illustrates exemplary delay profiles obtained by the LSI circuit 17 in the case where the reference test pattern signal is "0, 0, 0, 0, 0", and the other test pattern signals are "1, 0, 0, 0, 0", "0, 1, 0, 0, 0", "0, 0, 1, 0, 0", and "0, 0, 0, 1, 0".

FIG. 10 illustrates, from the left to right of the horizontal axis in order, a delay profile obtained from the test pattern signal "0, 0, 0, 1, 0"; a delay profile obtained from the test pattern signal "0, 0, 1, 0, 0"; a delay profile obtained from the test pattern signal "0, 1, 0, 0, 0"; and a delay profile obtained from the test pattern signal "1, 0, 0, 0, 0".

The delay profile obtained from the test pattern signal "0, 0, 0, 1, 0" shows characteristics of the distortion of the waveform of the current bit in the case where bit "1" is transmitted one bit before the current bit. The delay profile obtained from the test pattern signal "0, 0, 1, 0, 0" shows characteristics of the distortion of the current bit in the case where bit "1" is transmitted two bits before the current bit. The delay profile obtained from the test pattern signal "0, 1, 0, 0, 0" shows characteristics of the distortion of the current bit in the case where bit "1" is transmitted three bits before the current bit. The delay profile obtained from the test pattern signal "1, 0, 0, 0, 0" shows characteristics of the distortion of the current bit in the case where bit "1" is transmitted four bits before the current bit.

By combining a plurality of delay profiles obtained in this manner, when a signal including the current bit and previous bits arranged in a bit pattern and set to arbitrary values is transmitted, the distorted waveform of the current bit can be estimated on the basis of the bit pattern of the previous bits.

Figure 11:
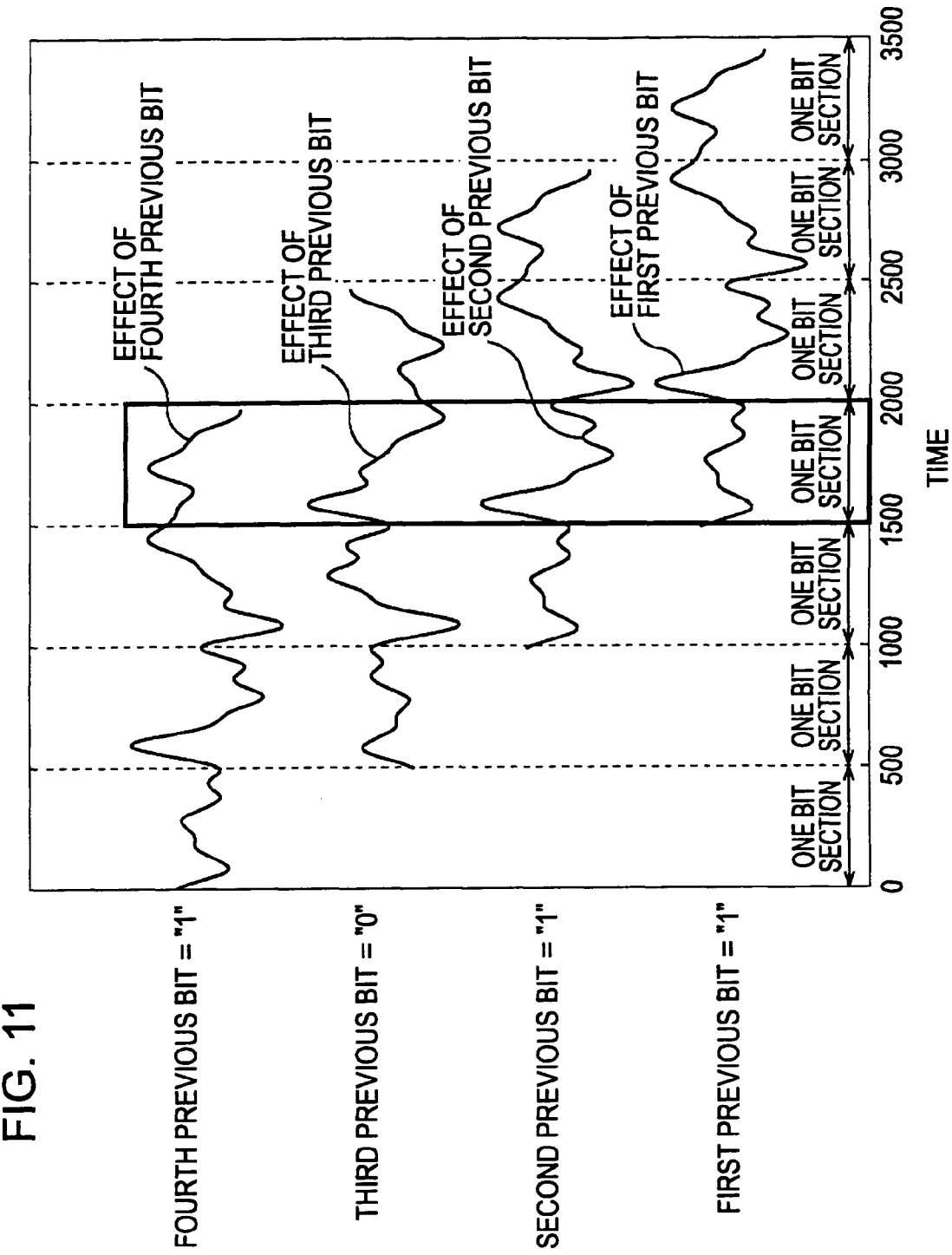
FIG. 11 illustrates the technique of obtaining the current bit waveform distorted in accordance with a bit pattern.

For example, FIG. 11 illustrates the distortion of the waveform of the current bit, which is estimated in the case where the bit pattern of previous four bits is "1, 0, 1, 1".

In FIG. 11, the current bit section (section from 1500 to 2000 of time represented in abscissa) is enclosed with a bald frame. In this section enclosed with the bald frame, waveforms represented by four delay profiles are illustrated.

More specifically, the top of the section enclosed with the bald frame illustrates a waveform represented by the delay profile obtained from the test pattern signal "1, 0, 0, 0, 0". The second from the top of the section enclosed with the bald frame illustrates an inverted waveform of a waveform represented by the delay profile obtained from the test pattern signal "0, 1, 0, 0, 0". In this case, 0 is transmitted three bits before the current bit. In order to combine inverted characteristics of distortion of the waveform of the current bit in the case where 1 is transmitted three bits before the current bit, the waveform represented by the delay profile obtained from the test pattern signal "0, 1, 0, 0, 0" is inverted.

The third from the top of the section enclosed with the bald frame illustrates a waveform represented by the delay profile obtained from the test pattern signal "0, 0, 1, 0, 0". The fourth from the top (the bottom) of the section enclosed with the bald frame illustrates a waveform represented by the delay profile obtained from the test pattern signal "0, 0, 0, 1, 0".

By combining these four waveforms illustrated in the section enclosed with the bald frame, if "1, 0, 1, 1" are transmitted prior to the current bit, the distortion of the waveform of the current bit can be estimated.

In FIG. 11, the case has been described in which the distortion of the waveform of the current bit is estimated by combining four delay profiles obtained in the case where four bits transmitted prior to the current bit cause distortion of the waveform of the current bit. For example, in the case where the distortion of the current bit is caused by n bits transmitted prior to the current bit, the waveform of the current bit can be estimated by combining n delay profiles.

Figure 12:
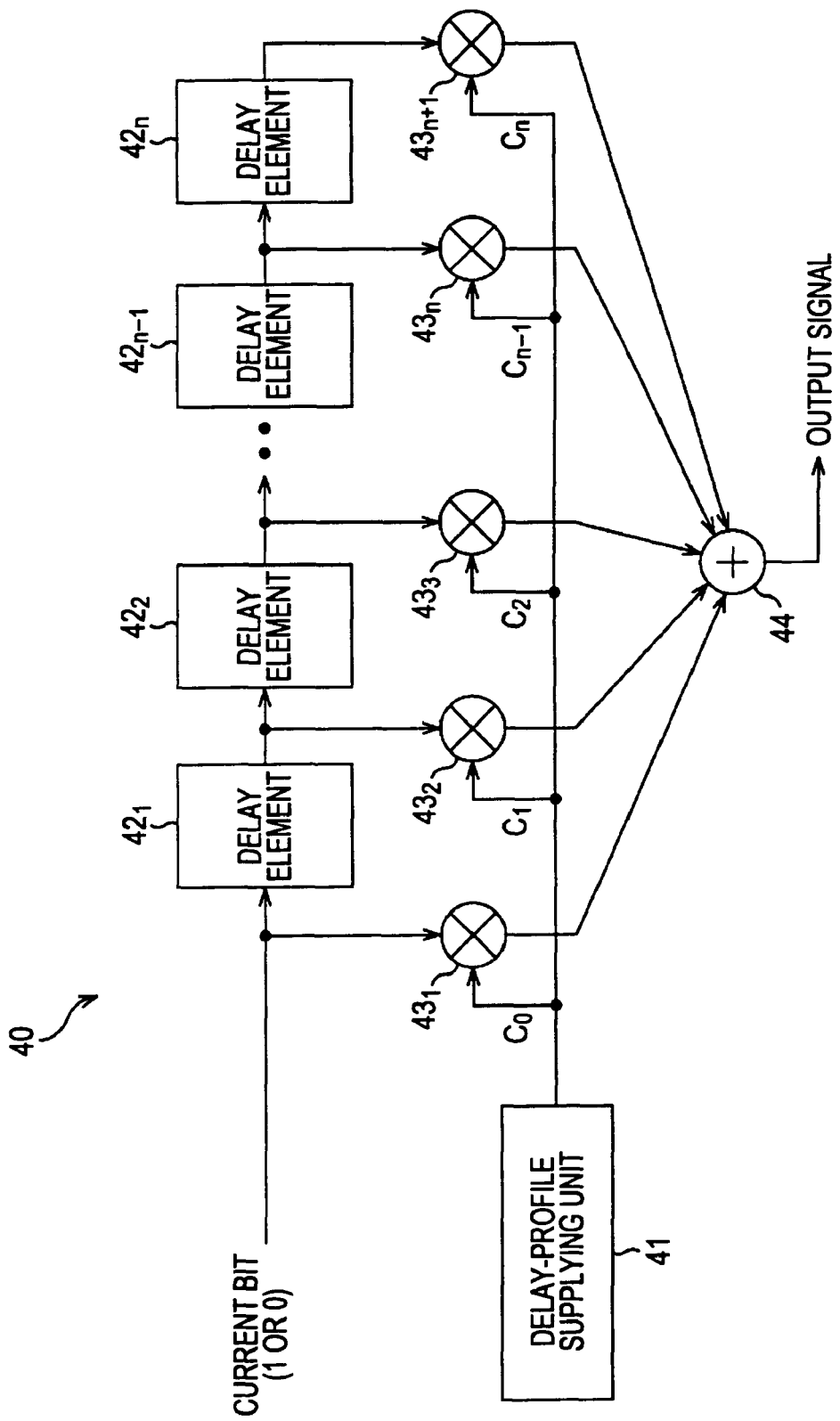
FIG. 12 is a block diagram of an exemplary structure of a computing unit for obtaining distortion of the waveform of the current bit.

FIG. 12 is a block diagram of an exemplary structure of a computing unit for combining n delay profiles in the case where n bits transmitted prior to the current bit cause distortion of the waveform of the current bit and estimating the combined waves as distortion of the waveform of the current bit.

Referring to FIG. 12, a computing unit 40 includes a delay-profile supplying unit 41, n delay elements $42_1$ to $42_n$, (n+1) multipliers $43_1$ to $43_{n+1}$, and an adder 44.

The delay-profile supplying unit 41 reads, for example, delay profiles stored in the delay profile memory 29 shown in FIG. 7. Hereinafter, a delay profile which is stored in the delay profile memory 29 and which shows characteristics of the distortion of the waveform of the current bit caused by delayed transmission of bit "1", which is transmitted n bits prior to the current bit, is referred to as a "delay profile $c_n$ of the n-th previous bit", if necessary. The waveform of the current bit obtained in the case where a reference test pattern signal is transmitted is referred to as a delay profile $C_0$ of the current bit.

The delay-profile supplying unit 41 supplies the delay profile $C_0$ of the current bit to the multipliers $43_1$, supplies the delay profile $C_1$ of the first previous bit to the multipliers $43_2$, supplies the delay profile $C_2$ of the second previous bit to the multipliers $43_3$, and, similarly, supplies the delay profile $C_n$ of the n-th previous bit to the multipliers $43_{n+1}$.

Each of the delay elements $42_1$ to $42_n$ outputs an input value with delay of one bit. That is, in the case where the value (1 or 0) of the current bit is input to the delay elements $42_1$, the delay element $42_1$ supplies the value of a bit one bit before the current bit to the delay element $42_2$ and the multiplier $43_2$. In the case where the value of the bit one bit before the current bit is supplied from the delay elements $42_1$ to the delay elements $42_2$, the delay elements $42_2$ supplies the value of a bit two bits before the current bit to the delay element $42_3$ and the multiplier $43_3$. Similarly, in the case where the value of a bit (n−1) bits before the current bit is supplied from the delay element $42_{n-1}$ to the delay element $42_n$, the delay element $42_n$ supplies the value of a bit n bits before the current bit to the multiplier $43_{n+1}$.

The delay profiles $C_0$ to $C_n$ are supplied from the delay-profile supplying unit 41 to the multipliers $43_1$ to $43_{n+1}$, respectively. The value (1 or 0) of the current bit supplied to the delay element $42_1$ is supplied to the multiplier $43_1$. The values of bits one to n bits before the current bit are supplied from the delay elements $42_1$ to $42_n$ to the multipliers $43_2$ to $43_{n+1}$, respectively. The multipliers $43_1$ to $43_{n+1}$ multiply the supplied values with the corresponding delay profiles $C_0$ to $C_n$ and supply the products to the adder 44.

The adder 44 outputs the sum of the values supplied from the multipliers $43_1$ to $43_{n+1}$. That is, the value output from the adder 44 is (the delay profile $C_0$ of the current bit×the value of the current bit)+(the delay profile $C_1$ of the first previous bit×the value of a bit one bit before the current bit)+(the delay profile $C_2$ of the second previous bit×the value of a bit two bits before the current bit)+ . . . +(the delay profile $C_n$ of the n-th previous bit×the value of a bit n bits before the current bit). In this manner, the waveform represented by the value output from the adder 44, that is, a combined waveform generated by combining the delay profiles, serves as the distorted waveform of the current bit, which is estimated from n bits transmitted before the current bit.

Figure 13A:
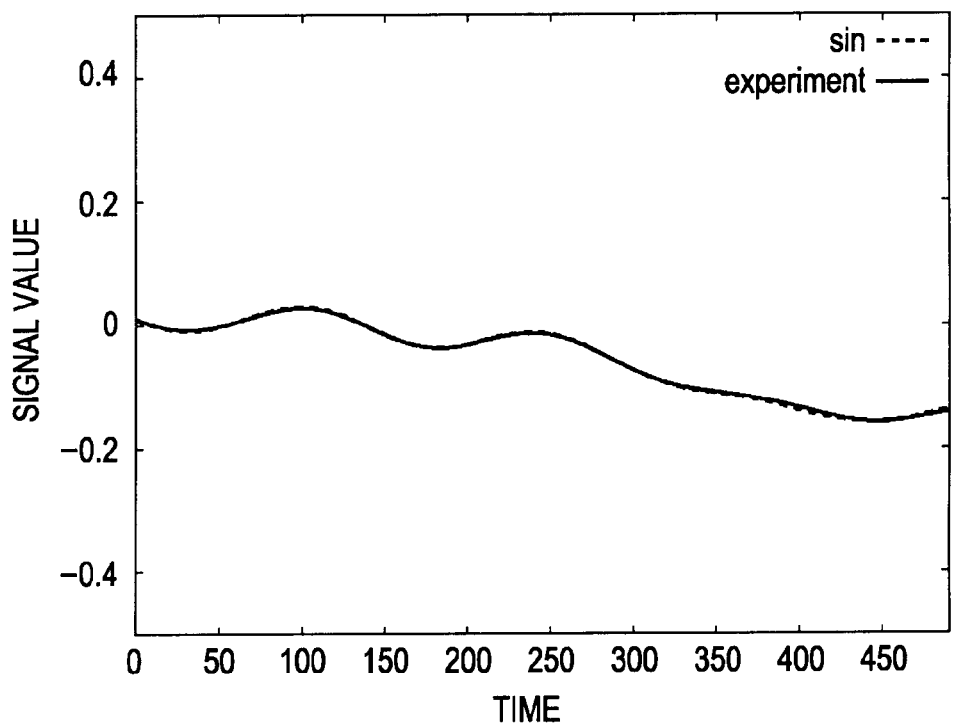
FIGS. 13A and 13B illustrate a combined waveform and an experiment waveform.
Figure 13B:
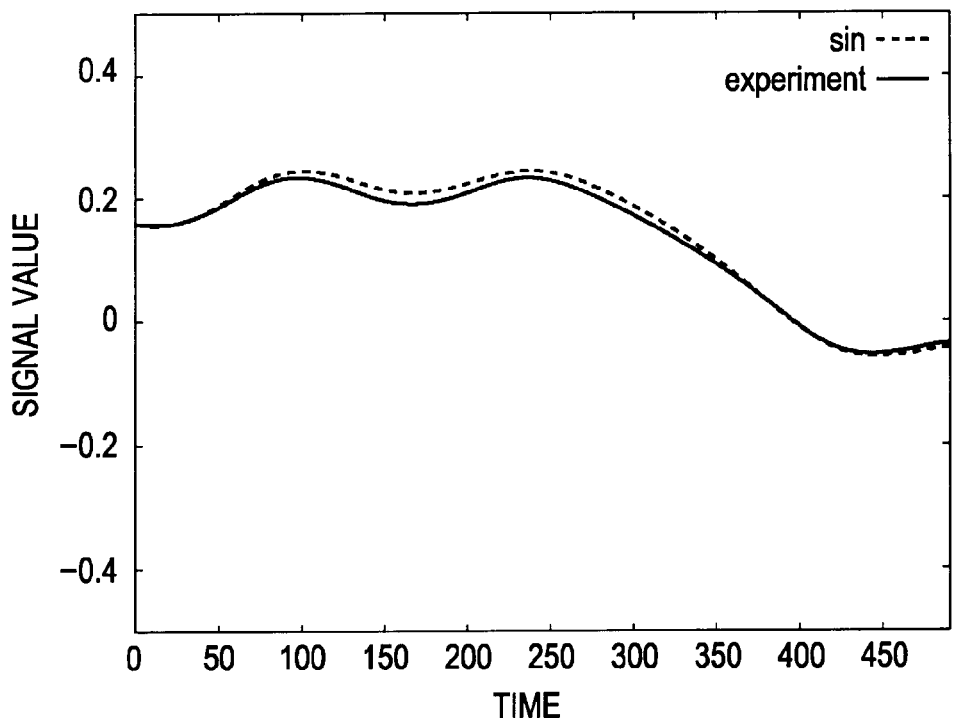

FIGS. 13A and 13B illustrate the combined waveform serving as the distorted waveform of the current bit, which is estimated by combining the delay profiles using the computing unit 40 shown in FIG. 12, and the waveform (experiment waveform) of the current bit of a signal received by the LSI circuit 17 shown in FIG. 2 performing wireless communication in the housing.

Referring to FIGS. 13A and 13B, a dotted line (sim) represents the combined waveform, and a solid line (experiment) represents the experiment waveform. FIG. 13A shows the combined waveform and the experiment waveform obtained on the basis of the signal "1, 1, 1, 1, 0". FIG. 13B shows the combined waveform and the experiment waveform obtained on the basis of the signal "1, 0, 0, 0, 0".

As shown in FIGS. 13A and 13B, the computing unit 40 can output the combined waveform substantially matching the experiment waveform which is the waveform of the current bit of the signal received by the LSI circuit 17 performing wireless communication in the housing.

Delay profiles are obtained by performing the above-described processing. Alternatively, delay profiles can be obtained by, for example, learning using the least squares method.

Figure 14:
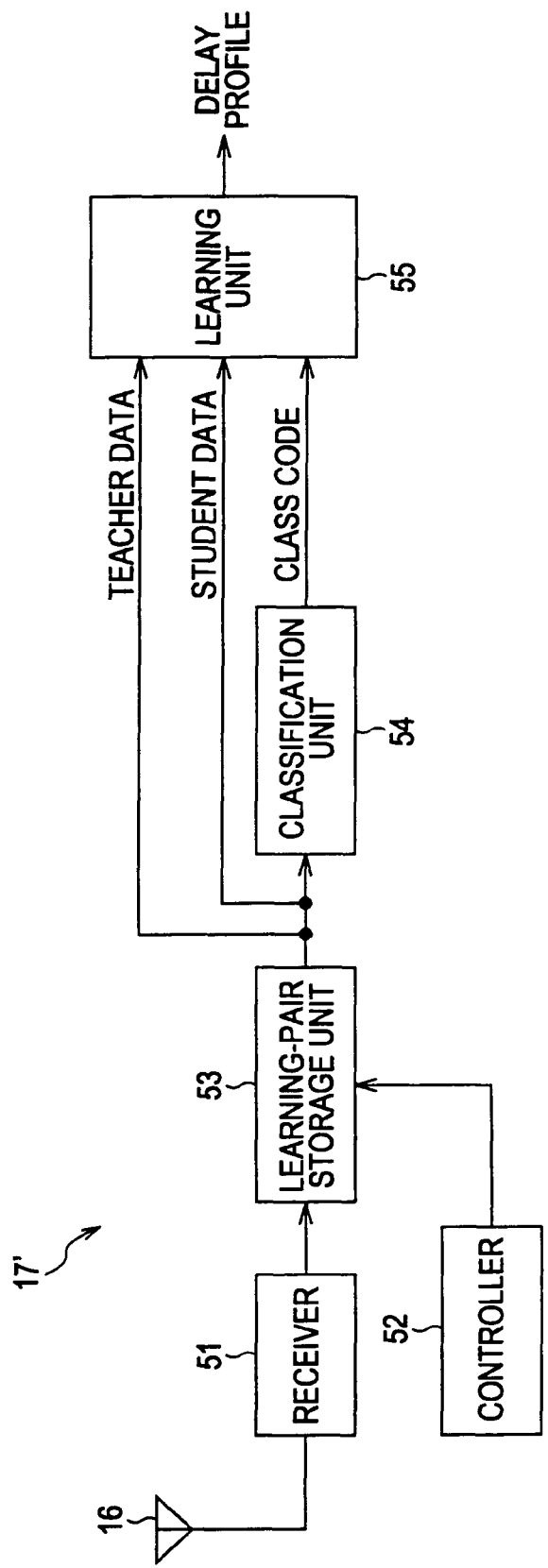
FIG. 14 is a block diagram of an exemplary structure of an LSI circuit 17' for obtaining a delay profile by learning using a least squares method.

FIG. 14 is a block diagram of an exemplary structure of an LSI circuit 17' for obtaining a delay profile by learning using the least squares method.

Referring to FIG. 14, the LSI circuit 17' includes a receiver 51, a controller 52, a learning-pair storage unit 53, a classification unit 54, and a learning unit 55.

The receiver 51 includes the LNA 21, the LO 22, the multiplier 23, the LPF 24, and the A/D converter 25 shown in FIG. 7 and is connected to the antenna 16. When the antenna 16 receives a test pattern signal transmitted from another LSI circuit 17 and supplies the test pattern signal to the receiver 51, the receiver 51 obtains signal values of bits from the test pattern signal. The receiver 51 supplies the signal value of the current bit of each test pattern signal to the learning-pair storage unit 53 in a sequential manner.

The controller 52 stores a protocol for communicating with other LSI circuits 17, as in the controller 30 shown in FIG. 7. The controller 52 supplies the same signal as the test pattern signal transmitted from the other LSI circuit 17 to the learning-pair storage unit 53 in accordance with the protocol. That is, the controller 52 supplies the test pattern signal transmitted from the other LSI circuit 17 to the learning-pair storage unit 53 when the receiver 51 obtains the signal value of the current bit.

The learning-pair storage unit 53 stores the signal value of the current bit, which is supplied from the receiver 51, and the test pattern signal supplied from the controller 52 in association with each other. That is, the learning-pair storage unit 53 stores the signal value of the current bit, which is obtained by the receiver 51, and the test pattern signal, which is transmitted from the other LSI circuit 17 when the receiver 51 obtains that signal value of the current bit, in association with each other. The learning-pair storage unit 53 supplies the signal value of the current bit as teacher data to the learning unit 55, and supplies the test pattern signal associated with the signal value of the current bit as student data to the learning unit 55. The learning-pair storage unit 53 supplies the test pattern signal to the classification unit 54.

The classification unit 54 classifies the test pattern signal into a predetermined class on the basis of the test pattern signal supplied from the learning-pair storage unit 53. The classification unit 54 generates a class code representing the class into which the test pattern signal has been classified and supplies the class code to the learning unit 55.

For example, the classification unit 54 generates two class codes on the basis of the value (1 or 0) of the current bit of each test pattern signal. For example, in the case where each test pattern signal is a 5-bit signal, the classification unit 54 generates 32 (=$2^5$) class codes on the basis of the values of bits of the signal.

Using the teacher data and the student data supplied from the learning-pair storage unit 53, the learning unit 55 performs learning using the least squares method for each of the classes into which classification is performed by the classification unit 54 and obtains a delay profile. The learning unit 55 outputs the delay profile obtained on a class-by-class basis and a class code representing that class in association with each other.

Figure 15:
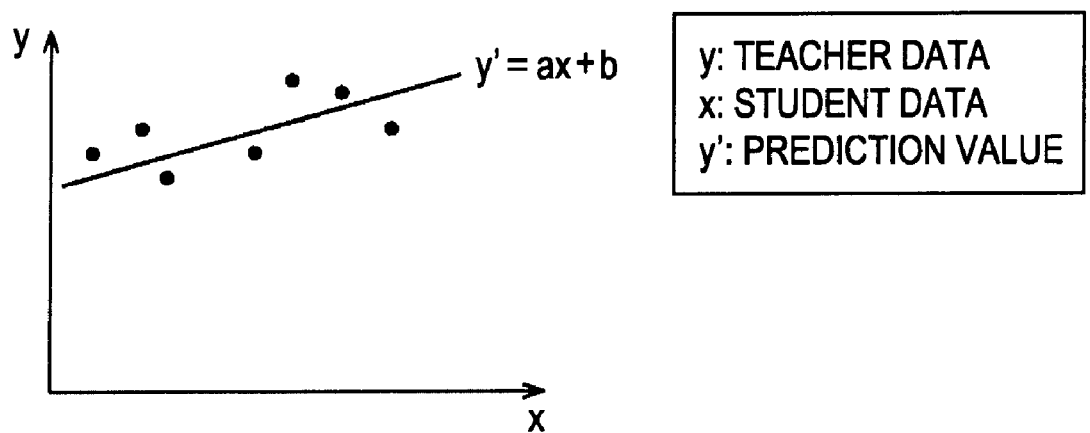
FIG. 15 illustrates the concept of the least squares method for use in learning using a learning unit 55.
Figure 16A:
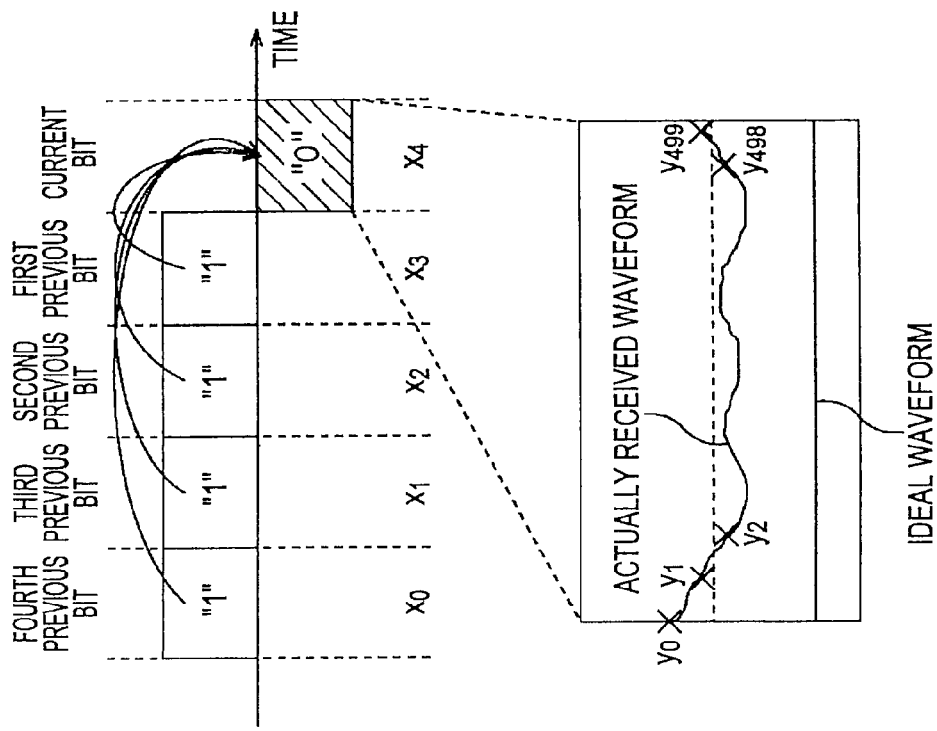
FIGS. 16A and 16B illustrate teacher data and student data for use in leaning using the learning unit 55.
Figure 16B:
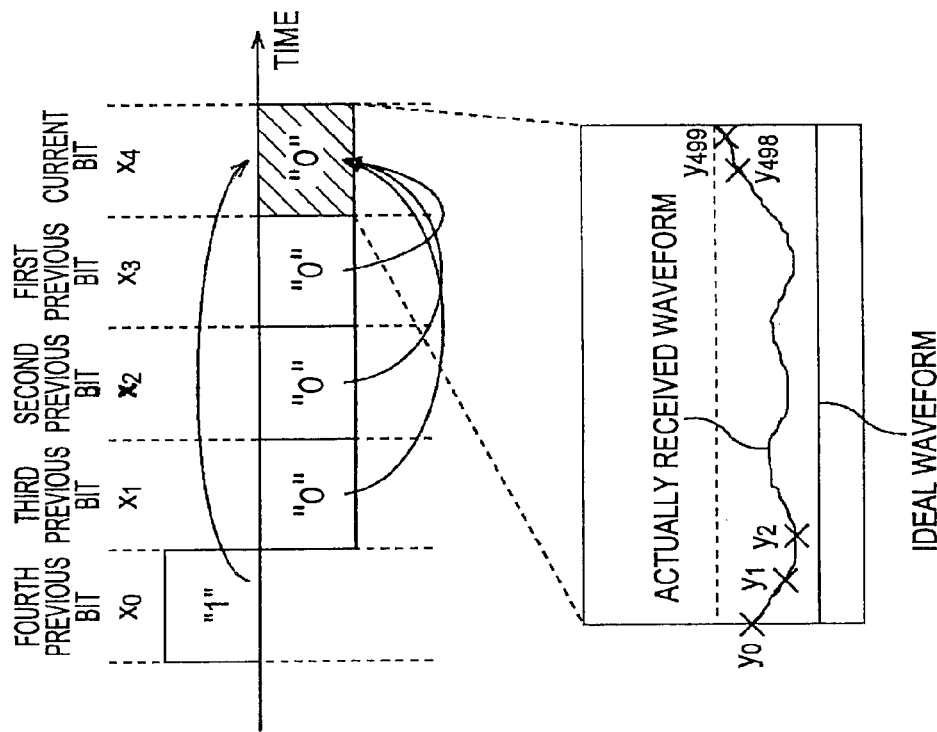

Referring now to FIGS. 15, 16A, and 16B, learning performed by the learning unit 55 will be described.

Referring to FIG. 15, the concept of the least squares method used in learning performed by the learning unit 55 will be described.

In FIG. 15, the axis of abscissa represents student data, and the axis of ordinate represents teacher data. FIG. 15 shows seven points represented by student data and teacher data associated with each other, and a straight line that best fits these seven points. The straight line is represented by the following linear prediction equation using a prediction value y', student data x, and coefficients a and b:

$$y' = a \cdot x + b \tag{1}$$

Assuming that a prediction error e between the prediction value y' obtained from equation (1) and the teacher data y is e=y−y', the sum of squared errors, which is represented by E, of the prediction errors can be expressed as:

$$E = \Sigma_{samples}(y - a \cdot x - b)^2 \tag{2}$$

where samples represent the number of samples.

In the example illustrated in FIG. 15, the number of samples is seven.

The least squares method is the method of obtaining the coefficients a and b so that the sum of squared errors E in equation (2) becomes minimum. Specifically, operations are performed on equation (2) so that partial differentials of the coefficients a and b become zero, as shown below:

$$\frac{\partial E}{\partial a} = 0 \tag{3}$$

$$\frac{\partial E}{\partial b} = 0 \tag{4}$$

Since equations (3) and (4) are linear equations, the coefficients a and b can be obtained from equations (3) and (4).

Using the least squares method as has been described above, the learning unit 55 obtains a delay profile.

Referring now to FIGS. 16A and 16B, teacher data and student data used in learning performed by the learning unit 55 will be described.

FIG. 16A illustrates the waveform of the current bit obtained from the test pattern signal "1, 0, 0, 0, 0". FIG. 16B illustrates the waveform of the current bit obtained from the test pattern signal "1, 1, 1, 1, 0". As shown in FIGS. 16A and 16B, the waveform of the current bit is a straight line (ideal waveform) if there is no effect of delayed transmission of bits transmitted prior to the current bit. However, the waveform actually received using wireless communication in the housing is distorted.

The values of bits of a test pattern signal "$X_0, X_1, X_2, X_3, X_4$" are used as student data. The waveform of the current bit obtained by actually receiving the test pattern signal "$X_0, X_1, X_2, X_3, X_4$" using wireless communication in the housing is sampled at, for example, 500 points, and these sampled values "$y_0, y_1, y_2, \ldots y_{499}$" are used as teacher data.

Given prediction coefficients $C_{0,0}, C_{0,1}, \ldots, C_{1,0}, C_{1,1}, \ldots C_{499,4}$ for obtaining prediction values y' from the student data $X_0$ to $X_4$, prediction equations for obtaining the prediction values y' are expressed as:

$$y'_0 = c_{0,0} \times x_0 + c_{0,1} \times x_1 + c_{0,2} \times x_2 + c_{0,3} \times x_3 + c_{0,4} \times x_4 \tag{5}$$

$$y'_1 = c_{1,0} \times x_0 + c_{1,1} \times x_1 + c_{1,2} \times x_2 + c_{1,3} \times x_3 + c_{1,4} \times x_4$$

$$y'_2 = c_{2,0} \times x_0 + c_{2,1} \times x_1 + c_{2,2} \times x_2 + c_{2,3} \times x_3 + c_{2,4} \times x_4$$

$$\cdot = \ldots \ldots \ldots \ldots \ldots$$

$$\cdot = \ldots \ldots \ldots \ldots \ldots$$

$$y'_{499} = c_{499,0} \times x_0 + c_{499,1} \times x_1 + c_{499,2} \times x_2 + c_{499,3} \times x_3 + c_{499,4} \times x_4$$

Subscripts of the prediction coefficients c include subscripts 0 to 499 on the left of the comma and subscripts 0 to 4 on the right of the comma. The subscripts 0 to 499 show the correspondence between the prediction coefficients and phase positions (500 sampling points) of the waveform of the current bit. The subscripts 0 to 4 show the correspondence between the prediction coefficients and the student data $X_0$ to $X_4$.

A prediction error $e_n$ between the prediction value $y_n'$ at each phase position n, which is obtained using a corresponding one of equations (5), and the teacher data $y_n$ is expressed as:

$$e_n = y_n - y'_n = y_n - \sum_{i=0}^{4} c_{n,i} \cdot x_i \tag{6}$$

The sum of squared errors $E_n$ obtained by adding the prediction errors $e_n$ obtained using equation (6), the number of which corresponds to the number of times the teacher data $y_n$ is sampled with respect to the student data $X_0$ to $X_4$, is expressed as:

$$E_n = \sum_{samples} e_n^2 \tag{7}$$

$$= \sum_{samples} \left( y_n - \sum_{i=0}^{4} c_{n,i} \cdot x_i \right)^2$$

$$= \sum_{samples} \left( y_n^2 - 2 \cdot y_n \cdot \sum_{i=0}^{4} c_{n,i} \cdot x_i + \left( \sum_{i=0}^{4} c_{n,i} \cdot x_i \right)^2 \right)$$

where samples is the number of pairs of student data and teacher data supplied to the learning unit 55.

For example, in the case where each test pattern signal is a 5-bit signal, as shown in FIGS. 16A and 16B, and the waveform of the current bit is sampled at 500 points, samples is 2500.

The learning unit 55 performs an operation so that all partial differentials in the case of the prediction coefficients $C_{n,i}$ of the sum of squared errors $E_n$ obtained using equation (7) are zero, that is, an operation for solving the prediction coefficients $C_{n,i}$ so that the following equation holds true:

$$\frac{\partial E_n}{\partial c_{n,i}} = 2 \sum_{samples} \frac{\partial e_n}{\partial c_{n,i}} e_n = 2 \sum_{samples} x_i \cdot e_n \qquad (8)$$

$$= 2 \sum_{samples} \left( x_i \cdot \left( y_n - \sum_{j=0}^{4} c_{n,j} \cdot x_j \right) \right) = 0$$

Equation (8) is expanded to yield:

$$\sum_{samples} \sum_{j=0}^{4} x_i \cdot x_j \cdot c_{n,j} = \sum_{samples} y_n \cdot x_i \qquad (9)$$

For equation (9), the learning unit 55 performs an operation to solve the prediction coefficients $C_{n,i}$ so that a total of 2500 equations (n=0 to 499 and i=0 to 4) hold true. Given s as samples, and equation (9) is represented as a determinant so that all of n=0 to 499 and i=0 to 4 in equation (9) are represented:

$$\begin{bmatrix} \sum_s x_0 \cdot x_0 & \sum_s x_0 \cdot x_1 & \sum_s x_0 \cdot x_2 & \sum_s x_0 \cdot x_3 & \sum_s x_0 \cdot x_4 \\ \sum_s x_1 \cdot x_0 & \sum_s x_1 \cdot x_1 & \sum_s x_1 \cdot x_2 & \sum_s x_1 \cdot x_3 & \sum_s x_1 \cdot x_4 \\ \cdots & \cdots & \cdots & \cdots & \cdots \\ \sum_s x_4 \cdot x_0 & \sum_s x_4 \cdot x_1 & \sum_s x_4 \cdot x_2 & \sum_s x_4 \cdot x_3 & \sum_s x_4 \cdot x_4 \end{bmatrix} \cdot \qquad (10)$$

$$\begin{bmatrix} c_{0,0} & c_{1,0} & \cdots & c_{499,0} \\ c_{0,1} & c_{1,1} & \cdots & c_{499,1} \\ \cdots & \cdots & \cdots & \cdots \\ c_{0,4} & c_{1,4} & \cdots & c_{499,4} \end{bmatrix} =$$

$$\begin{bmatrix} \sum_s y_0 \cdot x_0 & \sum_s y_1 \cdot x_0 & \sum_s y_2 \cdot x_0 & \cdots & \sum_s y_{499} \cdot x_0 \\ \sum_s y_0 \cdot x_1 & \sum_s y_1 \cdot x_1 & \sum_s y_2 \cdot x_1 & \cdots & \sum_s y_{499} \cdot x_1 \\ \cdots & \cdots & \cdots & \cdots & \cdots \\ \sum_s y_0 \cdot x_4 & \sum_s y_1 \cdot x_4 & \sum_s y_2 \cdot x_4 & \cdots & \sum_s y_{499} \cdot x_4 \end{bmatrix}$$

When equation (10) is represented as A·W=B, the student data and the teacher data supplied from the learning-pair storage unit 53 to the learning unit 55 are substituted for matrix A and matrix B. Thus, matrix A and matrix B are known, and matrix W represented by the prediction coefficients $C_{n,i}$ is unknown.

The learning unit 55 substitutes (supplements) the student data and the teacher data supplied from the learning-pair storage unit 53 for equation (10), and obtains the prediction coefficients $C_{n,i}$, that is, a delay profile, by obtaining matrix W using a general matrix solution, such as a sweeping out method.

Equation (10) is an equation for a certain class into which classification is performed by the classification unit 54. It is therefore necessary for the learning unit 55 to prepare m determinants on a class-by-class basis in the case where classification into m classes is performed.

The LSI circuit 17' can effectively obtain the prediction coefficients $C_{n,i}$ by calculating operations using learning pairs, the number of which satisfies the number of prediction coefficients $C_{n,i}$ and corresponds to the sufficient number of samples. However, even when the number of samples of learning pairs is small, the prediction coefficients $C_{n,i}$ can be obtained by obtaining matrix W using some sort of condition of constraint.

Figure 17:
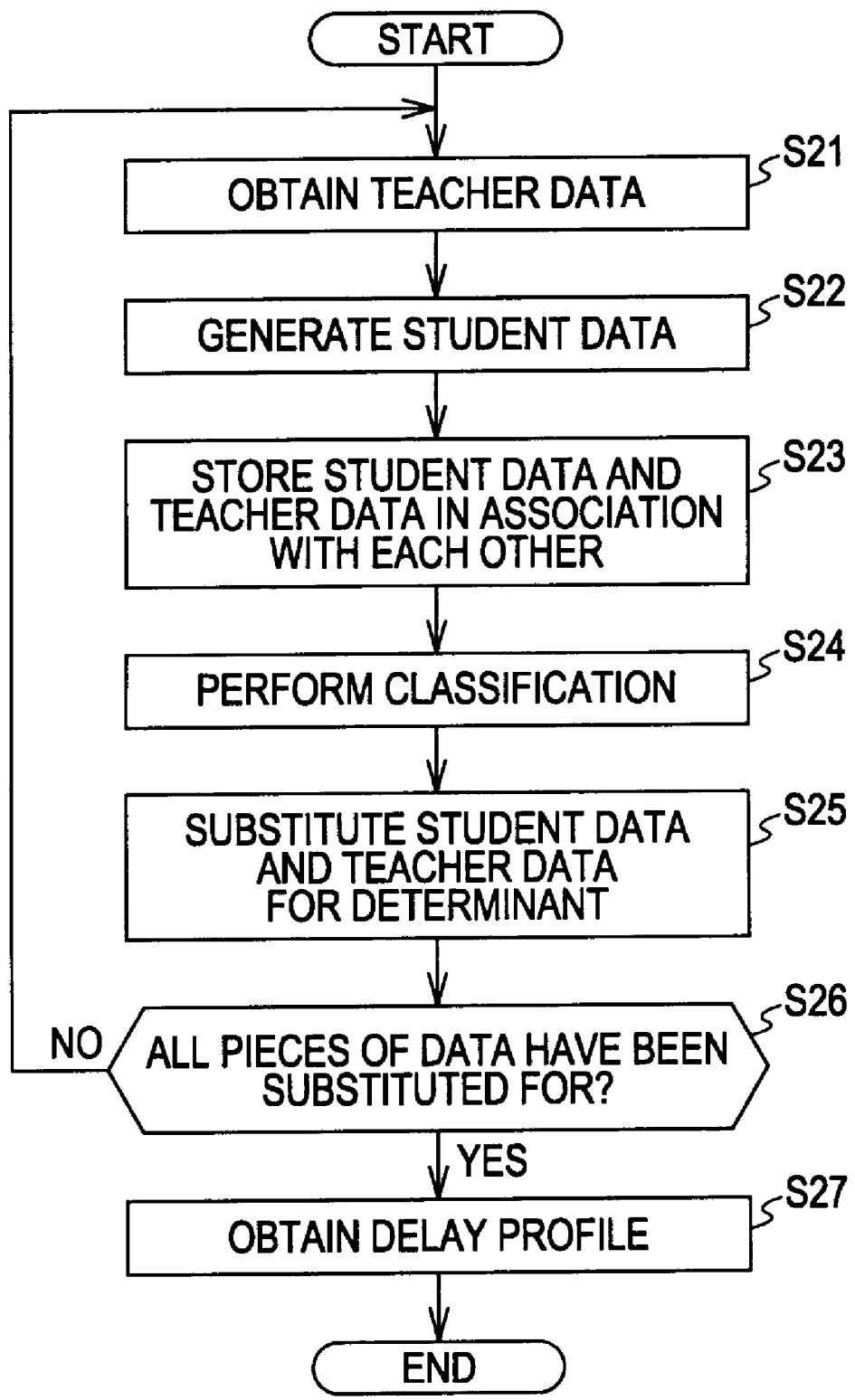
FIG. 17 is a flowchart of a process of obtaining a delay profile by learning using the least squares method using the LSI circuit 17'.

FIG. 17 is a flowchart of a process of obtaining a delay profile by learning using the least squares method using the LSI circuit 17'.

In the case where a test pattern signal is transmitted from another LSI circuit 17, and the antenna 16 receives the test pattern signal and supplies the test pattern signal to the receiver 51, in step S21, the receiver 51 obtains the signal value of the current bit, that is, teacher data, from the test pattern signal received by the antenna 16, and supplies the teacher data to the learning-pair storage unit 53.

After the processing in step S21, the flow proceeds to step S22. The controller 52 generates the same signal as the test pattern signal transmitted from the other LSI circuit 17 when the receiver 51 obtains the signal value of the current bit, that is, student data, and supplies the student data to the learning-pair storage unit 53. The flow proceeds to step S23.

In step S23, the learning-pair storage unit 53 stores the teacher data supplied from the receiver 51 in step S21 and the student data supplied from the controller 52 in step S22 in association with each other.

After the processing in step S23, the flow proceeds to step S24, and the learning-pair storage unit 53 supplies the test pattern signal serving as the student data to the classification unit 54. The classification unit 54 classifies the test pattern signal into a predetermined class on the basis of the test pattern signal, and supplies a class code representing the class into which the test pattern signal has been classified to the learning unit 55. The flow proceeds to step S25.

In step S25, the learning-pair storage unit 53 supplies the teacher data and the student data associated with each other to the learning unit 55, and the learning unit 55 substitutes the student data and the teacher data for equation (10).

After the processing in step S25, the flow proceeds to step S26, and the learning unit 55 determines whether all pieces of student data and teacher data for use in leaning have been supplied.

In the case where the learning unit 55 determines in step S26 that all the pieces of student data and teacher data for use in learning have been supplied, that is, all values have been substituted for matrices for which the student data and the teacher data should be substituted, the flow proceeds to step S27. In the case where the learning unit 55 determines in step S26 that not all the pieces of student data and teacher data for use in learning have been supplied, the flow returns to step S21, and the above-described processing is repeated from step S21 onward.

In step S27, the learning unit 55 uses a general matrix solution, such as a sweeping out method, to obtain a matrix represented by the prediction coefficients $C_{n,i}$ in equation (10), and, as a result, outputs the obtained prediction coefficients as a delay profile. The process ends.

As has been described above, a delay profile can be obtained by learning using the least squares method.

By estimating distortion of the waveform of a signal received using wireless communication in the housing on the basis of delay profiles obtained in this manner, a communication system can be examined with high accuracy.

For example, when designing a communication system, the arrangement of antennas may be examined to suppress signal distortion, or no signal may be allowed to be transmitted in the case of a bit pattern causing large signal distortion.

The receiver LSI circuit performing wireless communication in the housing estimates the distortion of the waveform of a signal on the basis of delay profiles and determines the bit values on the basis of the estimated waveform, thereby accurately determining the bit values and improving the quality of communication. The transmitter LSI circuit performing wireless communication in the housing estimates the distortion of the signal received by the receiver LSI circuit on the basis of the delay profiles and performs pre-emphasis processing for suppressing generation of distortion, thereby improving the quality of communication.

Since signal degradation can be eliminated on the basis of delay profiles, it is not necessary to suppress signal degradation due to radio wave interference by placing, for example, an electromagnetic wave absorber on the interior of the housing. Compared with the case where an electromagnetic wave absorber is placed on the interior of the housing of the signal processing apparatus, the cost of the product can be reduced. Even if an electromagnetic wave absorber is used, when designing a communication system, the arrangement of the electromagnetic wave absorber can be examined on the basis of delay profiles to effectively suppress signal degradation due to radio wave interference.

In wireless communication of the related art, for example, it is necessary to insert known data into packets in order to ensure the quality of communication. Since the quality of communication can be improved on the basis of delay profiles, it is not necessary to insert known data. As a result, packet overhead can be reduced, and high-speed communication can be performed.

In the case where communication is performed by a plurality of LSI circuits, that is, for example, in the case where communication is performed by the LSI circuits 17A to 17E shown in FIG. 2, each of the LSI circuits 17A to 17E obtains a delay profile for each of the other LSI circuits. For example, each of the LSI circuits 17A to 17E has its own coefficient, and each of the LSI circuits 17A to 17E stores coefficients of the other LSI circuits and delay profiles for use in receiving signals from the other LSI circuits in association with each other. Each of the LSI circuits 17A to 17E performs communication using a delay profile associated with the coefficient of an LSI circuit that has transmitted a signal, thereby performing communication of high quality.

In this embodiment, a signal having all bits being zero is used as a reference test pattern signal, and signals having one of the bits being one are used as other test pattern signals. Alternatively, for example, a signal having all bits being one may be used as a reference test pattern signal, and signals having one of the bits being zero may be used as other test pattern signals.

The series of processes described above can be performed using hardware or software. If software is employed to perform this series of processes, a program constituting the software is installed from a program recording medium onto a computer included in dedicated hardware or, for example, a general-purpose personal computer capable of performing various functions using various programs installed thereon.

FIG. 18 is a block diagram of an exemplary structure of a personal computer performing the foregoing series of processes using a program. A central processing unit (CPU) 101 performs various processes in accordance with a program stored in a read-only memory (ROM) 102 or a storage unit 108. A random-access memory (RAM) 103 stores a program executed by the CPU 101 and data, if necessary. The CPU 101, the ROM 102, and the RAM 103 are interconnected by a bus 104.

The CPU 101 is connected via the bus 104 to an input/output interface 105. The input/output interface 105 is connected to an input unit 106 including a keyboard, a mouse, a microphone, and the like, and an output unit 107 including a display, a loudspeaker, and the like. The CPU 101 performs various processes in accordance with instructions input from the input unit 106. The CPU 101 outputs the results of the processes to the output unit 107.

The storage unit 108 connected to the input/output interface 105 includes, for example, a hard disk and stores a program executed by the CPU 101 and various types of data. A communication unit 109 communicates with an external device via a network, such as the Internet or a local area network (LAN).

A program may be obtained via the communication unit 109 and stored in the storage unit 108.

A drive 110 connected to the input/output interface 105 drives a removable medium 111, such as a magnetic disk, an optical disk, a magneto-optical disk, or a semiconductor memory, when the removable medium 111 is mounted thereon, and obtains a program and data stored in the removable medium 111. The program and data obtained are transferred to the storage unit 108 and stored in the storage unit 108, if necessary.

A program recording medium storing a program to be installed into a computer and executed by the computer includes, as shown in FIG. 18, the removable medium 111 which is a packaged medium including a magnetic disk (including a flexible disk), an optical disk (including a compact disc-read only memory (CD-ROM) and a digital versatile disc (DVD)), a magneto-optical disk, or a semiconductor memory, the ROM 102 temporarily or permanently storing a program, and a hard disk constituting the storage unit 108. A program is stored into the program recording medium via the communication unit 109 which is an interface, such as a router or a modem, if necessary, using a wired or wireless communication medium, such as a LAN, the Internet, or digital satellite broadcasting.

The embodiment of the present invention is applicable to, besides an apparatus using a modulation scheme of transmitting one bit per symbol, an apparatus using a modulation scheme of transmitting a plurality of bits per symbol, such as quadrature phase shift keying (QPSK) or 8-phase shift keying (8PSK).

The embodiment of the present invention is applicable not only to wireless communication performed inside the housing of the apparatus, but also to wireless communication performed outdoors if delay profiles are constant. When transmitting a signal via a cable using an apparatus in which a signal is reflected from an end of the cable and signal distortion occurs due to the signal to be transmitted and the reflected signal, the quality of communication can be improved by applying the embodiment of the present invention to the apparatus.

The steps described with reference to the foregoing flowcharts may include steps that are performed sequentially in the order described in the flowcharts, as well as steps that are not necessarily performed sequentially but performed in parallel or individually (including, for example, parallel processing or processing based on objects).

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus configured to process a signal transmitted via a transmission path where a waveform represented by a signal value of a particular symbol is stationarily distorted in accordance with values of symbols transmitted prior to the particular symbol, comprising:
   receiving means for receiving a test signal which is the signal including symbols set to predetermined values via the transmission path;
   obtaining means for obtaining the signal value of the particular symbol from the test signal received by the receiving means; and
   characteristic computing means for computing a characteristic of distortion of the waveform represented by the signal value of the particular symbol in accordance with the values of the symbols transmitted prior to the particular symbol on the basis of waveforms represented by signal values obtained by the obtaining means from a plurality of test signals.

2. The signal processing apparatus according to claim 1, wherein the characteristic computing means includes
   storage means for storing a waveform represented by a signal value obtained from, among the plurality of test signals, a reference test signal serving as a predetermined reference, and
   subtracting means for subtracting the waveform stored in the storage means from a waveform represented by a signal value obtained from, a test signal other than the reference test signal, and obtaining a waveform generated as a result of the subtraction as the characteristic of the distortion.

3. The signal processing apparatus according to claim 1, wherein the characteristic computing means includes
   a classification unit configured to classify the plurality of test signals into predetermined classes on the basis of the values of the symbols of each of the plurality of test signals, and
   a learning unit configured to obtain the characteristic of the distortion by performing learning using a least squares method for each of the classes into which classification is performed by the classification unit on the basis of student data serving as a student and teacher data serving as a teacher in learning the characteristic of the distortion, the student data being the values of the symbols of each of the plurality of test signals, and the teacher data being the signal value of the particular symbol of each of the plurality of test signals, which is obtained by the obtaining means.

4. The signal processing apparatus according to claim 1, further comprising combining means for combining characteristics of distortion obtained by the characteristic computing means from the plurality of test signals and estimating distortion of a waveform represented by a signal value of a particular symbol of a signal including symbols set to arbitrary values, the distortion being caused by symbols transmitted prior to the particular symbol.

5. A signal processing method for processing a signal transmitted via a transmission path where a waveform represented by a signal value of a particular symbol is stationarily distorted in accordance with values of symbols transmitted prior to the particular symbol, comprising:
   obtaining the signal value of the particular symbol from a test signal which is received via the transmission path and which is the signal including symbols set to predetermined values; and
   computing a characteristic of distortion of the waveform represented by the signal value of the particular symbol in accordance with the values of the symbols transmitted prior to the particular symbol on the basis of waveforms represented by signal values obtained from a plurality of test signals.

6. A non-transitory computer-readable medium including a program, which when executed by a processor of a signal processing apparatus configured to process a signal transmitted via a transmission path where a waveform represented by a signal value of a particular symbol is stationarily distorted in accordance with values of symbols transmitted prior to the particular symbol, causes the signal processing apparatus to execute a process comprising:
   obtaining the signal value of the particular symbol from a test signal which is received via the transmission path and which is the signal including symbols set to predetermined values; and
   computing a characteristic of distortion of the waveform represented by the signal value of the particular symbol in accordance with the values of the symbols transmitted prior to the particular symbol on the basis of waveforms represented by signal values obtained from a plurality of test signals.

7. A signal processing apparatus configured to process a signal transmitted via a transmission path where a waveform represented by a signal value of a particular symbol is stationarily distorted in accordance with values of symbols transmitted prior to the particular symbol, comprising:
   an antenna configured to receive a test signal which is the signal including symbols set to predetermined values via the transmission path;
   an analog-to-digital (A/D) converter configured to obtain the signal value of the particular symbol from the test signal received by the receiving unit; and
   a characteristic computing unit configured to compute a characteristic of distortion of the waveform represented by the signal value of the particular symbol in accordance with the values of the symbols transmitted prior to the particular symbol on the basis of waveforms represented by signal values obtained by the A/D converter from a plurality of test signals.

8. The signal processing apparatus according to claim 7, wherein the characteristic computing unit includes
   a memory configured to store a waveform represented by a signal value obtained from, among the plurality of test signals, a reference test signal serving as a predetermined reference, and
   a subtracter configured to subtract the waveform stored in the memory from a waveform represented by a signal value obtained from, a test signal other than the reference test signal, and obtaining a waveform generated as a result of the subtraction as the characteristic of the distortion.

9. The signal processing apparatus according to claim 7, wherein the characteristic computing unit includes
   a classification unit configured to classify the plurality of test signals into predetermined classes on the basis of the values of the symbols of each of the plurality of test signals, and
   a learning unit configured to obtain the characteristic of the distortion by performing learning using a least squares method for each of the classes into which classification is performed by the classification unit on the basis of student data serving as a student and teacher data serving as a teacher in learning the characteristic of the distortion, the student data being the values of the symbols of each of the plurality of test signals, and the teacher data being the signal value of the particular symbol of each of the plurality of test signals, which is obtained by the A/D converter.

10. The signal processing apparatus according to claim 7, further comprising:
an adder configured to combine characteristics of distortion obtained by the characteristic computing unit from the plurality of test signals and estimate distortion of a waveform represented by a signal value of a particular symbol of a signal including symbols set to arbitrary values, the distortion being caused by symbols transmitted prior to the particular symbol.

* * * * *